US010725204B2

(12) United States Patent
Moran et al.

(10) Patent No.: US 10,725,204 B2
(45) Date of Patent: Jul. 28, 2020

(54) DATA COLLECTION METHOD AND APPARATUS

(71) Applicant: Weather Telematics Inc.

(72) Inventors: Robert J. Moran, Ottawa (CA); Malcolm Leslie Rook, Wold Newton (GB); Darryl Smith, Ottawa (CA)

(73) Assignee: Weather Telematics Inc., Ottawa, Ontario (CA)

( * ) Notice: Subject to any disclaimer, the term of this patent is extended or adjusted under 35 U.S.C. 154(b) by 0 days.

(21) Appl. No.: 15/173,550

(22) Filed: Jun. 3, 2016

(65) Prior Publication Data

US 2016/0282514 A1 Sep. 29, 2016

Related U.S. Application Data

(63) Continuation of application No. 14/105,142, filed on Dec. 12, 2013, now abandoned, which is a continuation-in-part of application No. 13/972,513, filed on Aug. 21, 2013, now abandoned.

(60) Provisional application No. 61/736,511, filed on Dec. 12, 2012, provisional application No. 61/691,757, filed on Aug. 21, 2012, provisional application No. 61/736,511, filed on Dec. 12, 2012.

(51) Int. Cl.
*G01W 1/00* (2006.01)
*G01W 1/02* (2006.01)

(52) U.S. Cl.
CPC ........ *G01W 1/02* (2013.01); *G01W 2001/006* (2013.01)

(58) Field of Classification Search
CPC ..................................................... G01W 1/02
See application file for complete search history.

(56) References Cited

U.S. PATENT DOCUMENTS

| 2,683,196 A | * | 7/1954 | Hunter | B60Q 9/003 |
| | | | | 200/561 |
| 3,924,099 A | * | 12/1975 | Housel | F24H 3/0417 |
| | | | | 165/122 |
| 4,320,949 A | * | 3/1982 | Pagano | G03B 17/08 |
| | | | | 219/201 |
| 4,613,938 A | | 9/1986 | Hansen et al. | |

(Continued)

FOREIGN PATENT DOCUMENTS

JP   10126080   5/1998

OTHER PUBLICATIONS

PCT/IB2013/003184 International Search Report and Written Opinion, dated Aug. 20, 2014.

*Primary Examiner* — Lisa M Caputo
*Assistant Examiner* — Alex T Devito
(74) *Attorney, Agent, or Firm* — Hamilton IP Law, PC; Jay R. Hamilton; Charles A. Damschen

(57) ABSTRACT

An illustrative embodiment of a data collection method and apparatus comprises at least one sensor that may be configured as a mobile data collection apparatus, which sensor may be in communication with a controller. The data collection apparatus may include one or more sensors, including but not limited to air pressure, air humidity, air temperature, road surface temperature, lightning distance, light level, precipitation rate, ozone level, carbon dioxide level, nitrous oxide level, and methane level; all of which may be in communication with a controller. One or more sensors may be positioned on or within a main assembly.

19 Claims, 41 Drawing Sheets

(56) References Cited

U.S. PATENT DOCUMENTS

| | | | |
|---|---|---|---|
| 4,846,399 A * | 7/1989 | Asselbergs | F04D 25/06 236/49.4 |
| 4,987,296 A | 1/1991 | Kajioka et al. | |
| 6,343,499 B1 * | 2/2002 | Inagaki | G01N 27/4175 73/23.2 |
| 6,757,607 B2 | 6/2004 | Rendahl et al. | |
| 7,164,365 B2 | 1/2007 | Doherty et al. | |
| 7,171,308 B2 | 1/2007 | Campbell | |
| 7,193,512 B1 | 3/2007 | Coulthard | |
| 7,403,840 B2 | 7/2008 | Moore et al. | |
| 7,706,965 B2 | 4/2010 | Downs et al. | |
| 7,813,870 B2 | 10/2010 | Downs et al. | |
| 7,831,380 B2 | 11/2010 | Chapman et al. | |
| 7,899,611 B2 | 3/2011 | Downs et al. | |
| 7,908,076 B2 | 3/2011 | Downs et al. | |
| 7,912,627 B2 | 3/2011 | Downs et al. | |
| 7,912,628 B2 | 3/2011 | Chapman et al. | |
| 8,014,936 B2 | 9/2011 | Chapman et al. | |
| 8,065,073 B2 | 11/2011 | Downs et al. | |
| 8,090,524 B2 | 1/2012 | Chapman et al. | |
| 8,160,805 B2 | 4/2012 | Downs et al. | |
| 8,190,362 B2 | 5/2012 | Barker et al. | |
| 2001/0029535 A1 * | 10/2001 | Hirano | G01N 1/2202 709/224 |
| 2005/0198985 A1 * | 9/2005 | Allen | F24F 13/20 62/244 |
| 2006/0061485 A1 | 3/2006 | Doherty et al. | |
| 2006/0157563 A1 | 7/2006 | Marshall | |
| 2010/0106345 A1 | 4/2010 | Hwang et al. | |
| 2012/0218411 A1 | 8/2012 | Wu et al. | |
| 2012/0310536 A1 | 12/2012 | Katayama et al. | |
| 2013/0179032 A1 | 7/2013 | Kyrtsos et al. | |
| 2013/0278427 A1 | 10/2013 | Setton | |

* cited by examiner

DATA COLLECTION METHOD AND APPARATUS

CROSS REFERENCE TO RELATED APPLICATIONS

This application claims the filing benefit of and is a continuation of U.S. patent application Ser. No. 14/105,142 filed on Dec. 12, 2013, which application claimed the filing benefit of provisional U.S. Pat. App. No. 61/736,511 filed on Dec. 12, 2012 and which application was a continuation in part of and claimed priority from U.S. patent application Ser. No. 13/972,513 filed on Aug. 21, 2013, which application claimed the filing benefit of provisional U.S. Pat. App. No. 61/691,757 filed on Aug. 21, 2012 and 61/736,511 filed on Dec. 12, 2012, all of which applications are incorporated by reference herein in their entireties.

FIELD OF INVENTION

The present invention relates to weather measurements, and more specifically, to mobile weather measurement systems that may be integrated with existing, on-board vehicle electronics.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

AUTHORIZATION PURSUANT TO 37 C.F.R. § 1.171 (D)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

Weather monitoring and forecasting is improved by increased granularity in data sampling. Traditional fixed-site sampling is done at airports and in some cases road weather stations (small weather stations along a highway); however, these fixed sites are usually separated by dozens of kilometers. Significant weather often goes undetected between fixed sites.

Telemetry and/or telematics as related to vehicles are growing fields, as evidenced by U.S. Pat. Nos. 7,706,965; 7,813,870; 7,831,380; 7,899,611; 7,908,076; 7,912,627; 7,912,628; 8,014,936; 8,065,073; 8,090,524; 8,160,805; and 8,190,362, all of which are incorporated by reference herein in their entireties.

Precipitation sensors such as those used to detect rain falling on a vehicle windscreen measure changes in reflectance or capacitance at that surface. Unless there is a mechanism in place to remove accumulated moisture, the precipitation level detected does not give a reliable indication that precipitation is continuing due to mobility of the accumulation. Such sensors are also particularly poor at detecting dry snow and hail as individual particles may not even contact the sensing elements.

Detection of approaching storm fronts is particularly difficult. Weather radars can give an indication, but this is generally over a large geographical area and do not give a good indication within smaller areas. It is generally accepted that electrical discharges are associated with active storm fronts. These may manifest themselves as discharges between clouds and earth or within the storm clouds. Discharges within clouds may, or may not, be visible or audible from the ground. Both types of discharge do produce characteristic bursts of broad-band electrical interference which may be detected by a radio receiver. Algorithms have been developed to convert such bursts into an estimation of distance between receiver and discharge location. The majority of discharges are associated with the leading edge of the storm system and the distance estimation of the discharge is therefore and estimation of the distance to the storm front. When measurements are made over a period of time from multiple vehicles, or a single vehicle at multiple locations, it is possible to use such data to triangulate the location and heading of the storm front.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

DETAILED DESCRIPTION

Figure 1:
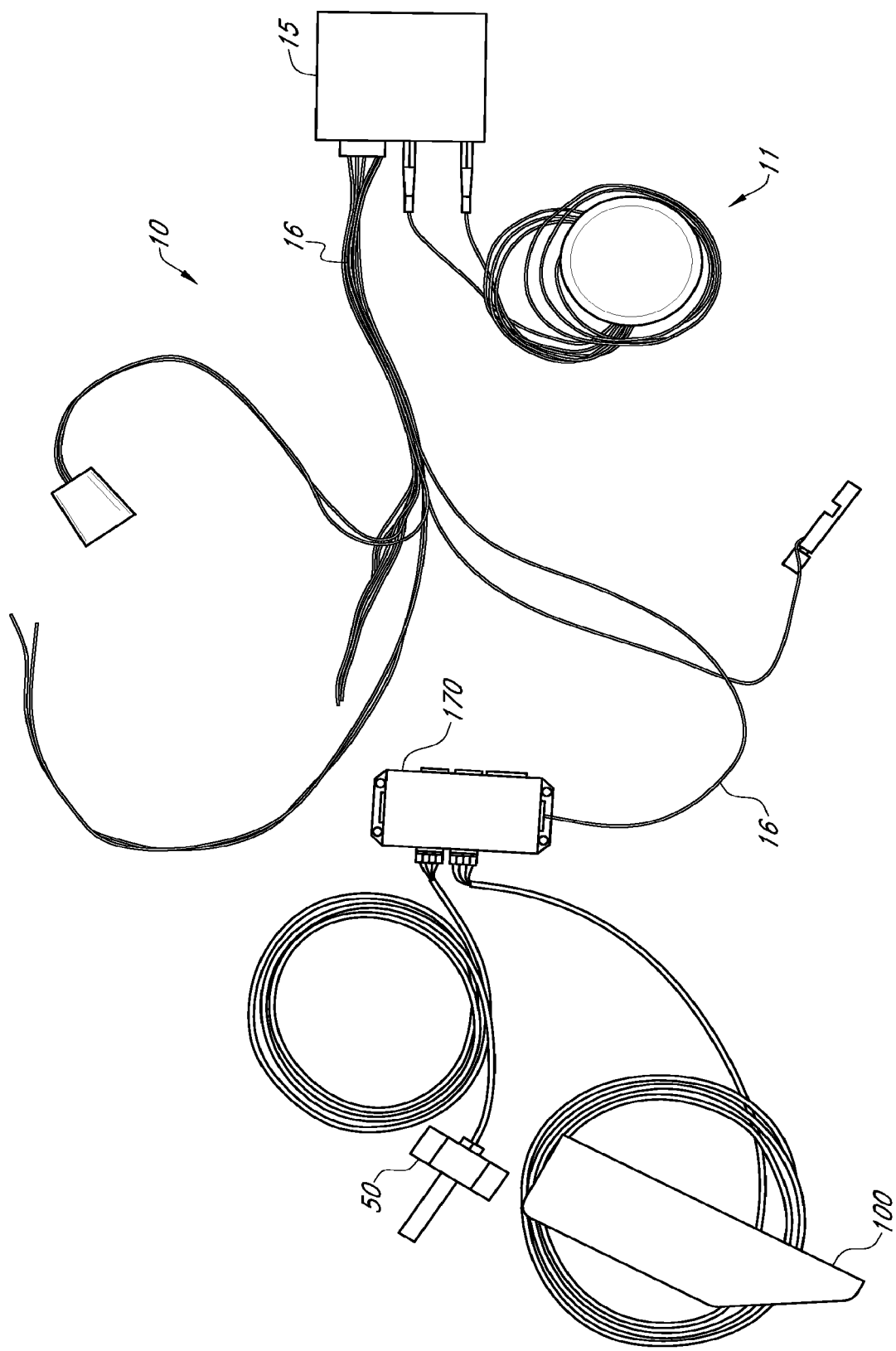
FIG. 1 is a perspective view of one embodiment of a data collection apparatus.

| ELEMENT DESCRIPTION | ELEMENT # |
|---|---|
| Data collection apparatus | 10 |
| Antenna | 11 |
| Vehicle | 12 |
| Cab | 12a |
| Deflector | 12b |
| Step board | 12c |
| Dash | 13 |
| Seal | 14 |
| Telematics unit | 15 |
| Conduit | 16 |
| Vehicle communication/power interface | 17 |
| Wind sensor | 40 |
| Top portion | 41 |
| Top portion cover | 41a |
| Top portion base | 41b |
| Spacer | 42 |
| Void | 43 |
| Bottom portion | 44 |
| Bottom portion cover | 44a |
| Ultrasonic circuitry | 44b |
| Cup | 44c |
| Ultrasonic sensor | 45 |
| Communication/power interface | 46 |
| GPS/communication circuitry | 48 |
| Surface temperature sensor | 50 |
| Cover | 52 |
| Base | 54 |
| Mounting bracket | 54a |
| Hood | 54b |
| Thermometer | 55 |
| Communication/power interface | 56 |
| Lens | 57 |
| Surface temperature sensor circuitry | 58 |
| Main assembly | 100 |

-continued

| ELEMENT DESCRIPTION | ELEMENT # |
|---|---|
| Interstitial area | 102 |
| Fastener | 104 |
| Exterior housing | 110 |
| Inlet | 112 |
| Outlet | 114 |
| Slope | 116 |
| Filter | 118 |
| Base | 120 |
| Extension | 122 |
| Baffle | 124 |
| Communication/power interface | 126 |
| Interior member | 130 |
| Entrance zone | 132 |
| Main sensing chamber | 134 |
| Temperature/humidity sensor | 135a |
| Lightning sensor | 135b |
| Ozone sensor | 135c |
| Side wall | 136 |
| Top wall | 138 |
| Primary circuitry | 138a |
| Front opening | 139 |
| Exhaust fan housing | 140 |
| Exit zone | 142 |
| Fan | 144 |
| Side wall | 146 |
| End wall | 147 |
| Top wall | 148 |
| Fan inlet | 148a |
| Precipitation sensor | 150 |
| Precipitation sensor circuitry | 151 |
| IR transmitter housing | 152 |
| IR receiver housing | 154 |
| Power and data conduit | 156 |
| Precipitation sensor base | 158 |
| Pyranometer | 160 |
| Pyranometer circuitry | 162 |
| Cover | 164 |
| Controller | 170 |
| Controller housing | 172 |
| Fuse | 173 |
| Base | 174 |
| Communication/power interface | 175 |
| Controller circuitry | 176 |
| Barometric pressure sensor | 177 |

Before the various embodiments of the data collection method and apparatus are explained in detail, it is to be understood that the present disclosure is not limited in its application to the details of construction and the arrangements of components set forth in the following description. The data collection method and apparatus is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the figures, and do not alone indicate or imply that the device or element referred to must have a particular orientation. In addition, terms such as "first", "second", and "third" are used herein and in the appended claims for purposes of description and are not intended to indicate or imply relative importance or significance. As used herein, the term "sensor" may indicate the specific sensing unit of a given sensor or the sensing unit and other components (e.g., circuitry, logic controllers, etc.) needed to allow the sensing unit to perform as desired.

The following detailed description is of the best currently contemplated modes of carrying out illustrative embodiments of the data collection method and apparatus 10. The description is not to be taken in a limiting sense, but is made merely for the purpose of illustrating the general principles of the data collection method and apparatus 20, since the scope thereof is best defined by the appending claims. Various inventive features are described below herein that can each be used independently of one another or in combination with other features.

Before the various embodiments of the present methods are explained in detail, it is to be understood that the methods are not limited in their application to the details of applications and/or parameters set forth in the following description or illustrated in the drawings. The methods are capable of other embodiments and of being practiced or of being carried out in various ways. Operational parameters included herein are for illustrative purposes only, and in no way limit the scope of the present methods.

The illustrative embodiments of a data collection method and apparatus 10 may provide a mobile data collection system for various uses, including but not limited to weather monitoring and forecasting. The data collection method and apparatus 10 and/or resulting data collection system may be in communication with the existing electrical and/or communication circuitry on a vehicle (e.g., via CAN, D2B, wirelessly, etc.).

Initial proof-of-concept testing involved siting individual sensors, such as a temperature sensor, on the front of a commercial vehicle, then establishing a connection through the vehicle's telemetry to pass an 'observation' to a central computer with which the vehicle communicated. This approach was conducted for three specific sensors: air temperature, road-surface temperature, and relative humidity. After this proof-of-concept testing, the inventor bundled the instruments/sensors into an enclosure ("data collection unit") that would be mounted at least one meter above the road surface. Because the instruments/sensors were positioned in an enclosure, they were sheltered from air rushing past (as was the case during proof-of-concept with instruments in the front of the vehicle). Accordingly, the data collection unit may require aspiration so that fresh ambient air was always circulating into the enclosure and registering with the instruments/sensors. The road-surface temperature sensor may remain separate, placed near the bottom of the vehicle, relatively close to the road surface, for optimal sensing. The instruments/sensors inside the enclosure may be increased and/or decreased in number. In addition to sensing of air temperature and relative humidity, other sensors may be added, including but not limited to those for sensing barometric pressure, light, precipitation, lightning distance detection, and ozone.

Mobile platforms offer a way to increase meteorological and environmental data sampling between fixed sites. The data obtained by mobile platforms provides information in areas never or infrequently sampled, which may improve meteorological predictive capability, as well as potentially alert the traveling public about a danger that exists, which danger would not be uncovered by fixed-site sampling.

Variable speed and/or movement of the data collection apparatus 10 can produce turbulence around the enclosure, which turbulence can produce variations in the pressure. Exposure to direct sunlight can produce localized heating. It is contemplated, therefore, that the enclosure be aerodynamically profiled to minimize pressure variation and the airflows may be engineered to ensure that the air temperature measured by the instrument unit is a true reflection of the actual value of the surrounding air resulting in true meteorologically approved data.

Generally, the illustrative embodiment of a data collection method and apparatus 10 comprises one or more data collection units (which may be simply configured as a sensor or as a plurality of sensors integrated into a single enclosure or other structure) and one or more databases. Each data collection unit may be configured to collect various types of data and relay that data to a database in real time (or near real time), or store the data on the data collection unit (or other device having data storage capability) for later download.

Figure 2A:
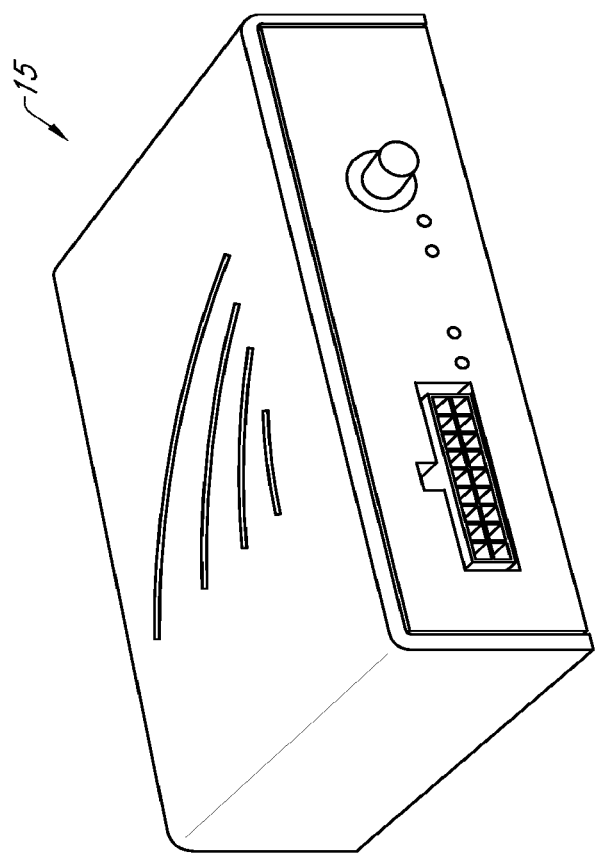
FIG. 2A is a perspective view of one embodiment of a telematics unit that may be used with various embodiments of a data collection apparatus.
Figure 2B:
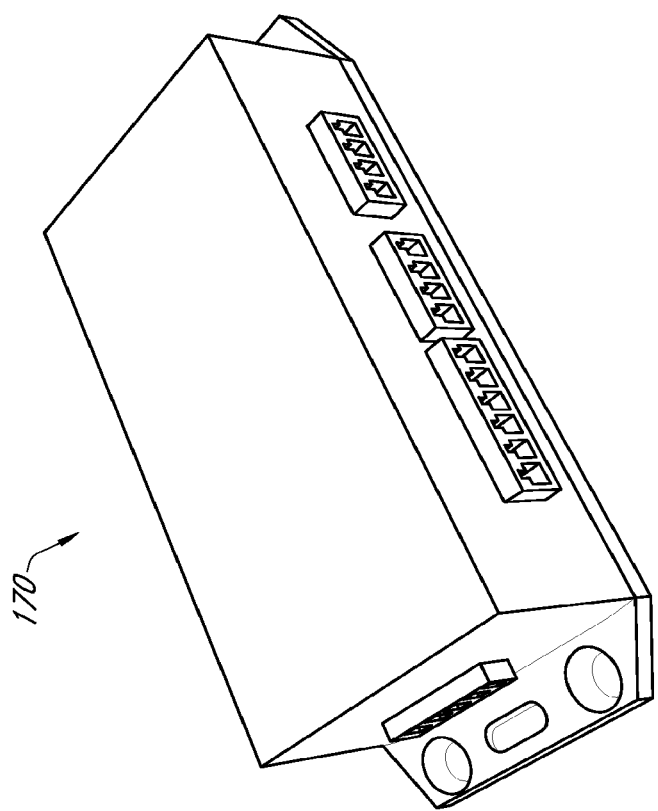
FIG. 2B is a perspective view of one embodiment of a central controller that may be used with various embodiments of a data collection apparatus.
Figure 3:
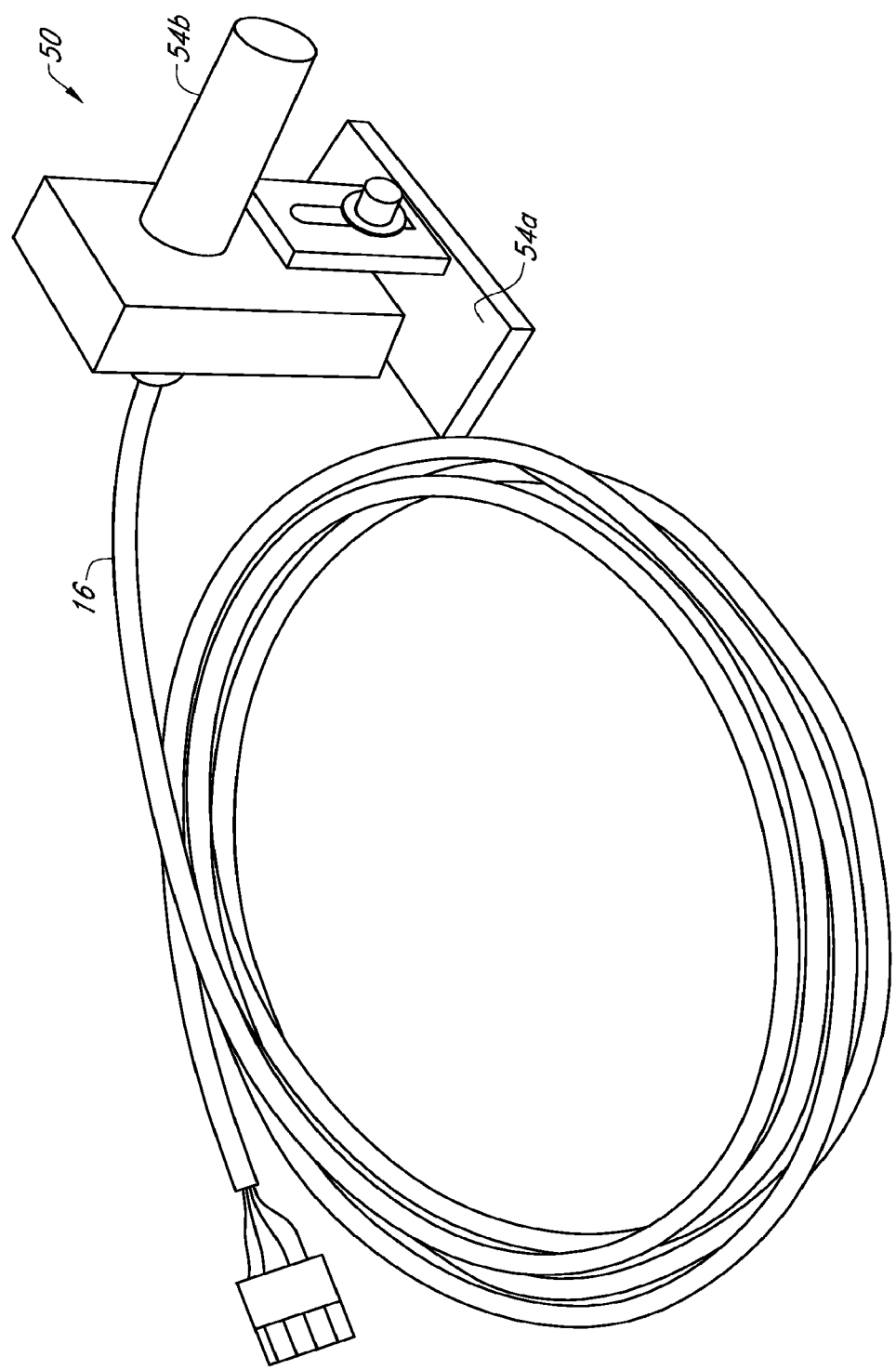
FIG. 3 is a perspective view of one embodiment of a road surface temperature sensor that may be used with various embodiments of a data collection apparatus.
Figure 4:
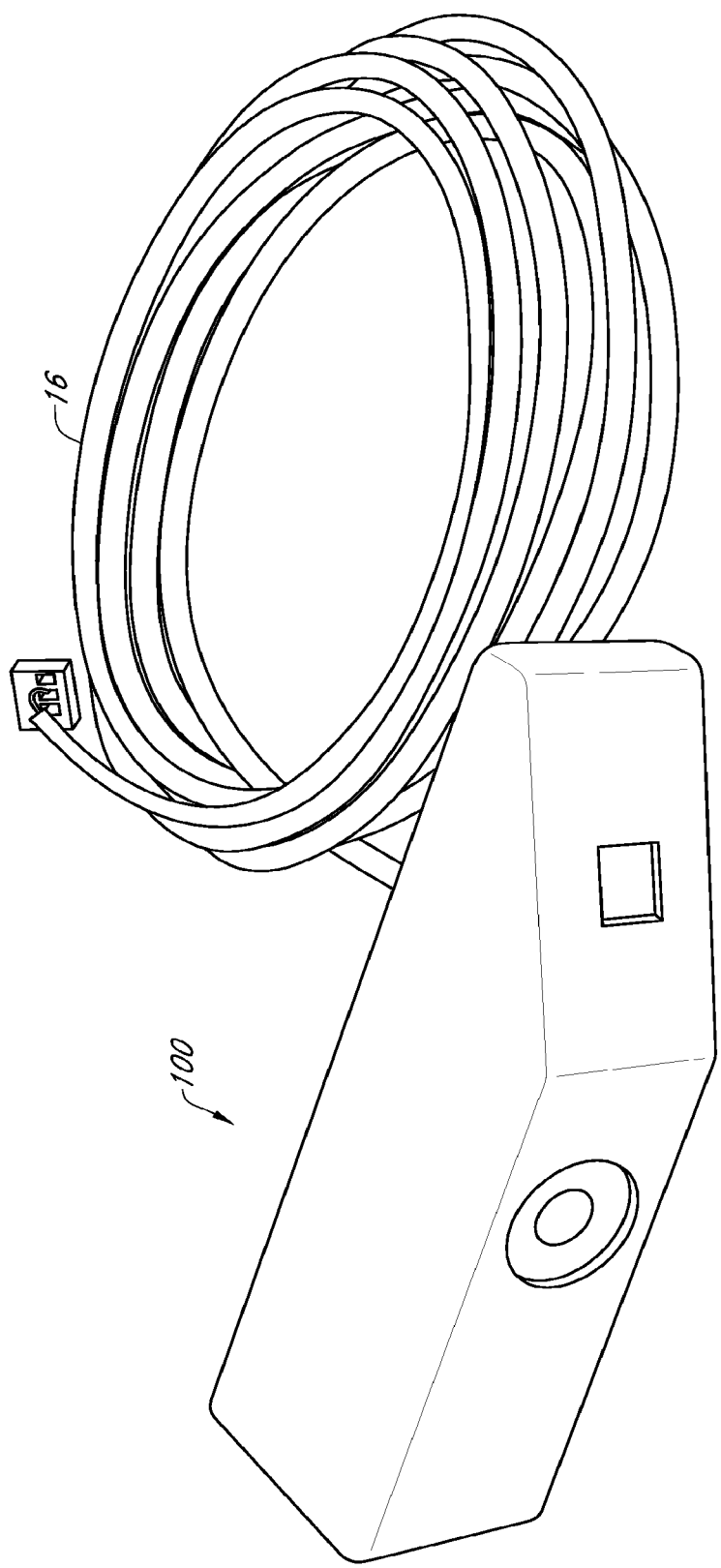
FIG. 4 is a perspective view of one embodiment of a main assembly that may be used with various embodiments of a data collection apparatus.
Figure 5:
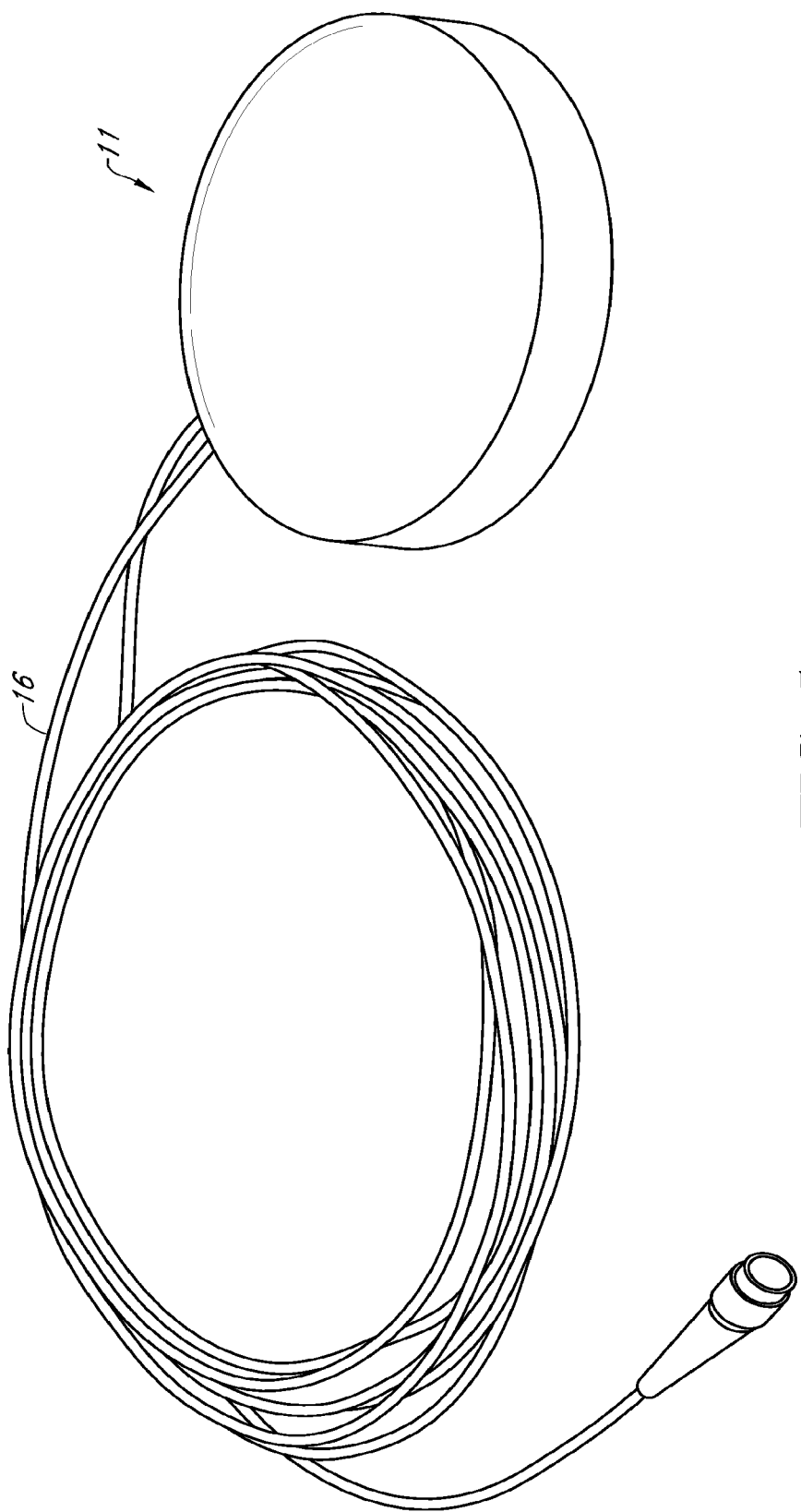
FIG. 5 is a perspective view of one embodiment of a wind sensor that may be used with various embodiments of a data collection apparatus.

One embodiment of a data collection apparatus 10 as shown in FIG. 1 comprises a main sensor assembly 100, a surface temperature sensor 50, and a data receiver/transmitter (transponder), which may be in communication with an antenna 11, all of which may be integrated with one another or which may be distinct but in communication with one another. Another embodiment of a data collection apparatus 10 comprises a central controller 170, transponder, main sensor assembly 100, and a surface temperature sensor 50. Additional sensors may also be connected to the controller 170 to measure climatic, environmental, and/or application-specific parameters. In the illustrative embodiments, the data collection apparatus 10 or a portion thereof may be mounted to a land vehicle. However, in other embodiments the data collection apparatus 10 or a portion thereof may be configured to be mounted to other vehicles or mobile platforms, such as water vehicles, air vehicles, and/or combinations thereof. A perspective view of a first embodiment of a telematics unit 15 that may be used with various embodiments of the data collection method and apparatus 10 is shown in FIG. 2A. A perspective view of a first embodiment of a controller 170 that may be used with various embodiments of the data collection method and apparatus 10 is shown in FIG. 2B. A first embodiment of a surface temperature sensor 50 and associated conduit 16 that may be used with various embodiments of the data collection method and apparatus 10 is shown in FIG. 3. A perspective view of a first embodiment of a main assembly 100 that may be used with various embodiments of a data collection method and apparatus 10 is shown in FIG. 4. A perspective view of a first embodiment of an antenna 11 that may be used with various embodiments of a data collection method and apparatus 10 is shown in FIG. 5.

Figure 6:
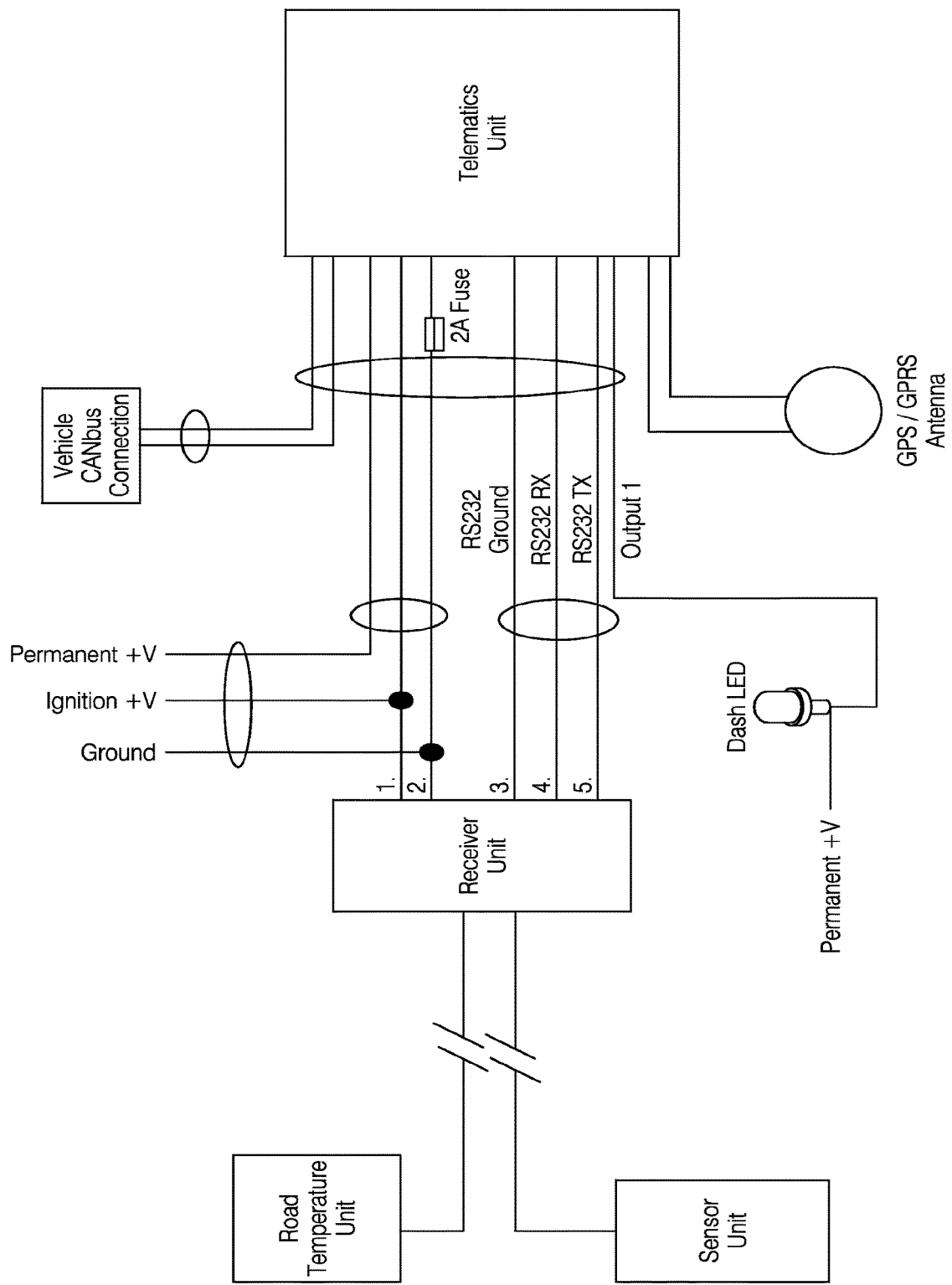
FIG. 6 is a block schematic of one embodiment how various elements of one embodiment of a data collection apparatus may communicate with one another.

A simplified schematic of the communication and/or power configuration for a first illustrative embodiment of a data collection method and apparatus is shown in FIG. 6. As shown, various sensors may be in communication with a receiver unit. The receiver unit, in turn, may be in communication with a telematics unit 15, which telematics unit 15 may also be in communication with existing devices on the vehicle, which may be accomplished via the vehicle CAN-bus connection, as shown in FIG. 6.

Various sensors may be positioned in or on the main sensor assembly 100, including but not limited to air pressure, air humidity, air temperature, light level and/or irradiance, precipitation rate, ozone level, carbon dioxide and/or monoxide level, nitrous oxide level, and methane level. Alternatively, the air quality sensors may be incorporated into a separate housing to optimize placement. The optimal combination of sensors will vary from one application to the next, and therefore the combination thereof is in no way limiting to the scope of the data collection method and apparatus. A surface temperature sensor 50 may be mounted external to the main sensor assembly 100, or it may be mounted external thereto to achieve relatively close proximity to the road, ground, and/or water surface, depending on the embodiment of the data collection apparatus 10.

The main sensor assembly 100 may be designed to achieve a smooth laminar airflow with minimal turbulence at inlet and exhaust vents. This minimizes the creation of a low pressure area at those ports that could adversely affect pressure measurements. The main sensor assembly 100 may include baffles 124 to minimize intake of undesired matter (e.g., water, debris, foreign matter) and/or to minimize heating of internal sensors by radiant energy from the sun. A fan 144 may be fitted to the main sensor assembly 100 for continual exchange of air being sensed to increase the accuracy of temperature, humidity, ozone levels, and/or any other air parameter sensor, if such sensors are included in that particular embodiment. The air flow rate may be selected to minimize evaporative cooling effects, and the fan 144 may be placed in the exhaust stream to avoid heating of the air passing over the sensors. Layout of the printed circuit boards supporting the sensors may be engineered to minimize power consumption and to avoid localized heating of sensors from heat generated by the circuit elements.

All sensors engaged with the main sensor assembly 100 may be in communication with a data transponder (which may integrated with a controller 170), which may in turn be in communication with a vehicle telematics unit 15 or a telematics unit 15 integrated into the data collection apparatus 10 and/or a component thereof (such as one illustrative embodiment of a wind sensor 40 described and pictured herein). In one embodiment, a standard 1 Mb/s CANBUS may be used for the various sensors to communicate with one another and/or the transponder, and for the transponder to communicate with the vehicle telematics unit 15. Other structures and/or methods for facilitating this communication may be used between the system units, or between system units and external devices. The telematics unit 15 may provide GPS location data, time, and/or other data (e.g., vehicle speed, throttle position, etc.) to the data from the data collection apparatus 10 to create a complete data packet. Alternatively, GPS location data, time, and/or other data may be provided via a separate GPS unit positioned elsewhere within the data collection apparatus 10. A complete data packet may be stored locally or it may be transmitted to an external location.

It is contemplated that one embodiment of a precipitation sensor 150 may be configured as a sensor integral with the main sensor assembly 100, wherein the electrical resistance of that sensor changes according to precipitation levels to give an indication of rain intensity. Properly calibrated, this precipitation sensor 150 may be accurate and precise enough to respond to foggy conditions. Alternatively the precipitation sensor 150 may embody a transmissive or reflective system whereby a beam of light, having a wavelength in the visible or infra-red range, is detected at a level that varies according to whether droplets of moisture affect the properties of the path from emitter to detector, as described in further detail below.

It is contemplated that one embodiment of an ambient light sensor may be positioned under a clear cover such that the sensor may respond to all light levels normally encountered from full sunlight (up to 200,000 lux) down to complete absence of visible light (0 lux). To achieve such a range, one embodiment of an ambient light sensor uses a digital sensor with a maximum sensitivity of 100,000 lux and a full spectrum filter to double its range, wherein the resolution may be from 1 to 100 lux. Alternatively a pyranometer 160 may be included wherein the sensing element is a thermopile or cosine compensated silicon photodiode. Such an embodiment would have the capability of measuring irradiance over the range of 0 Watts/m$^2$ to at least the maximum generally accepted value of 1400 Watts/m$^2$ for full sunlight at altitude with the sun directly overhead. The resolution of such a device may be 0.1 Watts/m$^2$.

It is contemplated that one embodiment of a barometric pressure sensor 177 may be digital and may have an operating range of 300 hPa to 1100 hPa. This allows for accurate pressure measurements, and may have a resolution of 0.01 hPa.

It is contemplated that one embodiment of a temperature/humidity sensor 135a may be digital and may have an operating range of 5% Rh to 100% Rh with a resolution of 0.01% Rh. This sensor 135a may be temperature-compensated for increased accuracy and may be fitted with a filter that allows it to function even if small droplets of water are deposited upon its surface from the measurement air stream.

It is contemplated that one embodiment of a temperature/humidity sensor 135a may be digital and may have an operating range of −40° C. to +80° C. and a resolution of 0.0625° C., which allows accurate temperature measurements. Such a device may be integral with the humidity and/or barometric pressure sensor. 177.

It is contemplated that one embodiment of a lightning sensor 135b may be digital and may have an operating range of 0 to 40 kilometers. Such a sensor 135b may incorporate hardware or software algorithms to discriminate against false indications caused by impulse or burst-type electrical interference commonly experienced with vehicle electrical systems.

It is contemplated that one embodiment of an ozone sensor 135c may be analogue and may have an operating range of 0 to 1000 ppb and a resolution of 1 ppb.

In the illustrative embodiment, all sensors may be controlled by one or more automotive grade microprocessors that may have analogue inputs, an I2C interface for communication to the digital sensors, and a CANBUS interface for communication to the other units in the system. Power may be supplied from the vehicle battery system and sophisticated switched mode regulators may provide stable low voltage supplies from inputs of 6 to 28 volts DC or such a range as may be found on commercial and/or private-use vehicles.

One illustrative embodiment of a surface temperature sensor 50 may incorporate a narrow angle infra-red thermometer 55 at the proximal end of a hood 54b. This thermometer 55 may have an operating range of −40° C. to +100° C. with a resolution of 0.01° C. The configuration of the hood 54b and thermometer 55 may have at least two main functions. Firstly it may prevent ambient sunlight from striking the sensing element either directly or by reflection, and secondly the air column formed in the hood 54b may effectively block contamination of the sensing element by dirt and moisture from the road surface.

The thermometer 55 may measure the average temperature of all objects impinging into a cone described by subtending an included angle of 10° from the sensing element. The hood 54b may be sized such that no part impinges on the cone of measurement. When fitted to the vehicle 12, the surface temperature sensor 50 may be positioned so that no part of the vehicle structure impinges into the measurement cone. Under these conditions the surface temperature sensor 50 effectively measures the average temperature of a disc on the surface underneath the vehicle 12 to which the surface temperature sensor 50 is engaged. Under ideal circumstances this disc is 100-200 mm diameter, and specifically approximately 105 mm with the sensing element positioned between 200-1000 mm above the road surface, and specifically approximately 600 mm.

The surface temperature sensor 50 may be controlled by an automotive grade microprocessor, which may have an I2C interface for communication to the digital sensor and a CANBUS interface or other communications interface for communication to the other units in the system. Power may be provided from the vehicle battery system and a sophisticated switched mode regulator may provide stable low voltage supplies from inputs of 6 to 28 volts DC or such a range as may be found on commercial and/or private-use vehicles.

A controller 170 may provide a central communications hub for the data collection apparatus 10. An automotive grade microprocessor with CANBUS or other bus-type interface and serial interfaces may monitor bus activity and route messages according to the address header. Upon receipt of certain predefined messages, the controller may forward the data via the serial interface to the vehicle telematics unit 15 or other communications system where it may be stored, compressed, analysed, and/or transmitted (e.g., via a radio modem) to a central data server. Power may be derived from the vehicle battery system or other power source (e.g., wind and/or solar generators). A sophisticated switched-mode regulator may provide stable low voltage supplies from inputs of 6 to 28 volts DC or such a range as may be found on commercial and/or private-use vehicles.

To further improve accuracy, the sensors and their associated microprocessors and/or circuitry may be configured to store calibration parameters to offset or modify measurements. Such parameters may be read or updated by physical connection to the sensor units and/or data collection apparatus 10, or via an over-the-air communications system from a remote location. Such updating may be provided in real-time with no resets necessary to incorporate the revised settings.

Any sensor in the data collection apparatus 10 may take frequent observations at a programmable interval (e.g., 10 seconds). The reporting interval may be read or updated by physical connection to the sensor units and/or data collection apparatus 10, or via an over-the-air communications system from a remote location. The observations include but are not limited to air temperature, surface (e.g., road) temperature, relative humidity, barometric pressure, ambient light, precipitation rate, wind speed, and ozone. This rate of frequency of observation provides the ability to detect meteorological or environmental phenomenon at a spatial interval of 275 meters (at typical highway speed). The data can help identify local hazards including but not limited to black icing, precipitation, or fog. The microscale resolution of the observations is helpful to meteorologists who need to determine weather conditions between fixed sites. The pavement temperature attribute can help meteorologists or transportation officials determine where pavement conditions are a potential hazard and areas that subsequently might require anti-ice treatment.

The CANBUS interface may be especially useful in various embodiments of the data collection method and apparatus 10 due to its widespread adoption for this type of application. Alternatively any other protocol may be used such as serial or I2C or wireless communications using Bluetooth, Zigbee or any other serial communications protocol. These would be low power and preferably, but not exclusively, utilise frequencies within ISM bands. This creates a road weather information system for any territory in which a data collection apparatus 10 is deployed. This takes advantage of the weather information from at least a 0-2000 foot range. Additionally, the various elements of the data collection method and apparatus 10 as disclosed herein may be in communication with one another (e.g., sensor-to-sensor, sensor-to-controller, controller-to-transponder, etc.) or with external circuitry (e.g., transponder-to-external computer, controller-to-external computer, etc.) either wired or wirelessly, or using any other suitable method and/or conduit 16 appropriate for the specific application of the data collection method and apparatus 10.

In certain embodiments of the data collection method and apparatus 10, the data collected via a plurality of sensors may be aggregated and analysed using self-learning, artificial intelligence. In such an embodiment, the accuracy of any weather predictions may be increased via subsequent data analysis based on historical patterns given the enormous amount of data the present disclosure may provide. It is contemplated that a predictive model employing such a self-teaching analysis program, which would become more accurate after each analysis, will be much more accurate and efficient than current weather prediction models.

Certain embodiments of the data collection method and apparatus 10 as disclosed herein may be configured to operate via interval sensing or via adaptive interval sensing. If configured to operate via interval sensing, the sensor observations may be collected every n seconds, and may be buffered and sent back to a collection point at a predetermined frequency. It is contemplated that in certain situations, this method of operation may miss anomalies in the observations if such anomalies occur between the sensing intervals.

If configured to operate via adaptive interval sensing, the sensor equipment may be configured to poll at much faster intervals, which may be as fast as multiple times per second depending at least upon the type of sensor used. The controller 170 (or any other component of a data collection method and apparatus 10 having the necessary hardware and/or software) may be configured to analyze this data in real-time and buffer observations every n seconds (emulating regular interval sensing). As part of the real-time analysis, the telematics box also may be configured to identify/detect anomalies and/or patterns in the data, which identification/detection may trigger out-of-band observation buffering for as long as an anomaly is detected. Utilizing these various techniques, the data collection method and apparatus 10 may be capable of capturing all anomalistic observations while simultaneously keeping data usage within practical limits. The data collection method and apparatus 10 may be configured so that one may adapt the interval during non-anomalistic conditions to account for the extra data usage from data used during anomalistic observations. The interval may be continuously in flux as anomalistic conditions are detected and then accounted for (based on total data used) by increasing interval length during the non-anomalistic observation periods, eventually returning to the n second intervals. The data collection method and apparatus 10 may be configured to always to try to return to the n second observation interval.

In one illustrative embodiment, the various sensors take a reading every 10 seconds, and 2-minutes worth of the data from those sensors is stored in a buffer prior to transmission. However, when configured to operate via adaptive interval sensing, the controller 170 (or other component of the data collection method and apparatus 10 having the necessary hardware and/or software) may be configured to identify anomalies, abnormalities, highs, and/or lows in data from a given sensor, and/or other specific weather event and/or environmental condition or potential therefor. When the controller 170 (or other component capable of such identification) identifies such an event, the controller 170 (or other component configured with the necessary capability) may command the sensor experiencing the event to take a reading every 1 second or such lesser interval as may be considered suitable having regard to the parameter being sensed. Additionally, the controller 170 (or other component configured with the necessary capability) may be configured to allow the data from this event to be transmitted immediately rather than stored in a buffer.

In an illustrative embodiment of the data collection method and apparatus 10, the various sensors may be continually sensing (e.g., taking a reading every 1 second), and each sensor may have the inherent capability of identifying an anomaly, abnormality, high, and/or low in data which that sensor is reading, or other specific weather event and/or environmental condition or potential therefor. This capability may be through a microprocessor integrated with the sensor or via the communication between the sensor and the controller 170 (or other component of the data collection method and apparatus 10 capable of such identification). Accordingly, the sensor experiencing such an event, or a component in communication with the sensor, may alert the controller 170 (or other relevant component of the data collection method and apparatus 10), which may in turn increase the rate at which data from that sensor is recorded, and/or increase the rate at which data from that sensor is transmitted to a database and/or analyzed.

For example, if a surface temperature sensor 50 senses a decrease in the surface temperature of a road at an abnormal rate (e.g., 3 degree temperature decrease in 5 seconds), the controller 170 (or other relevant component of the data collection method and apparatus 10) may increase the rate at which data from the surface temperature sensor 50 is recorded (e.g., from 10 seconds to 1 second) and/or increase the rate at which that data is transmitted to a database and/or analyzed (e.g., from 2 minutes to 1 second). In this example, adaptive interval sensing may allow the data collection method and apparatus 10 to detect a potentially slippery road surface and/or provide alerts thereof. However, as is apparent to those of ordinary skill in the art in light of the present disclosure, a data collection method and apparatus 10 configured for adaptive interval sensing may provide an infinite number of benefits related to detecting various environmental and/or meteorological conditions without limitation.

Additionally, in a data collection method and apparatus 10 configured with adaptive interval sensing, one or more components of the data collection apparatus 10 (e.g., controller 170, surface temperature sensor 50, precipitation sensor 30, etc.) may be accounted for simultaneously to create cases for different types of conditions. In such an embodiment the combination of different data from more than one sensor over a given period of time may give rise to the identification of and anomaly, abnormality, high, and/or low in data which that sensor is reading, or other specific weather event and/or environmental condition or potential therefor.

Figure 7B:
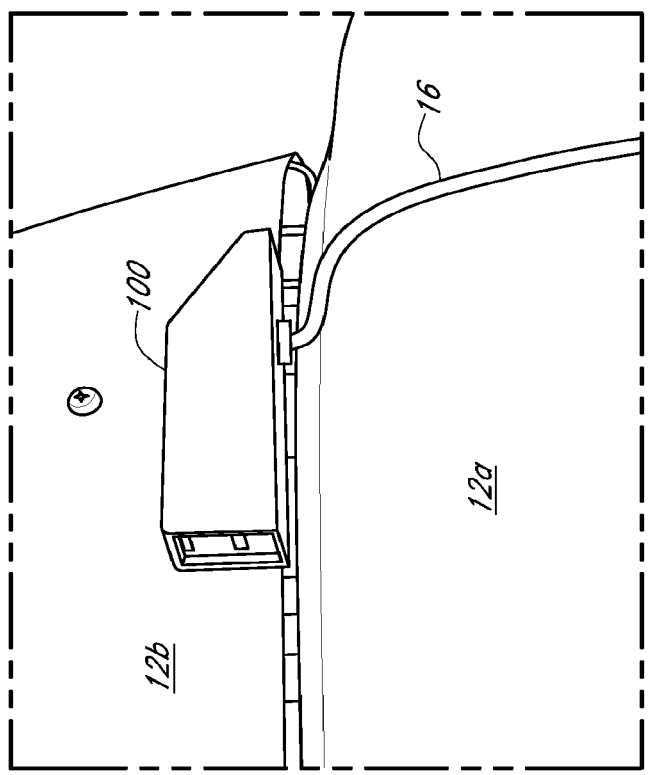
FIG. 7B is a perspective view of the vehicle shown in FIG. 7A with one embodiment of a main assembly engaged with the vehicle.
Figure 7A:
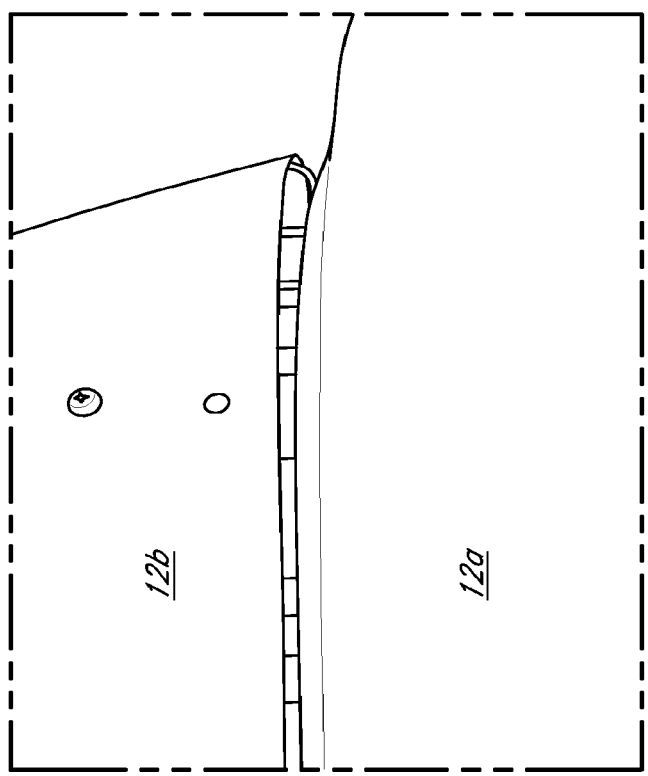
FIG. 7A is a perspective view of one embodiment of a vehicle with which various embodiments of a data collection apparatus may be engaged.
Figure 8:
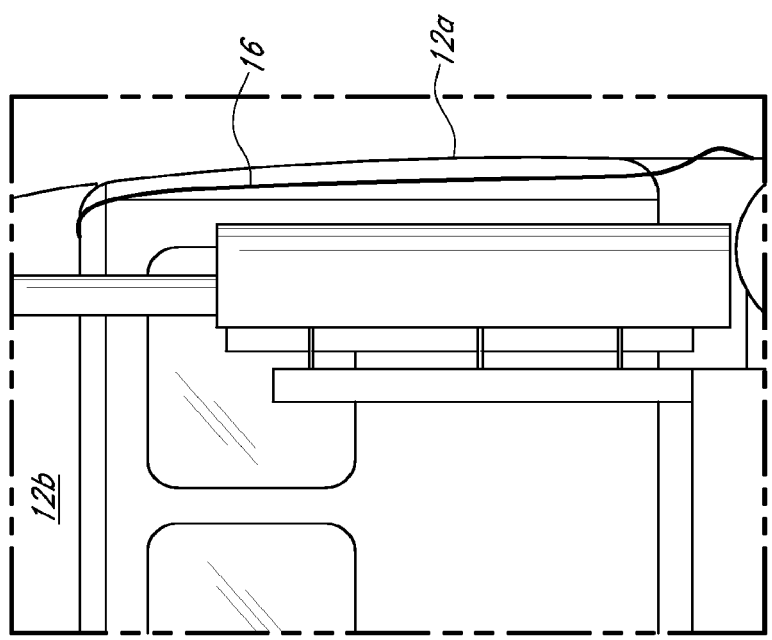
FIG. 8 is a perspective view of the vehicle shown in FIG. 7 showing where various cables and/or conduits may be placed.
Figure 9:
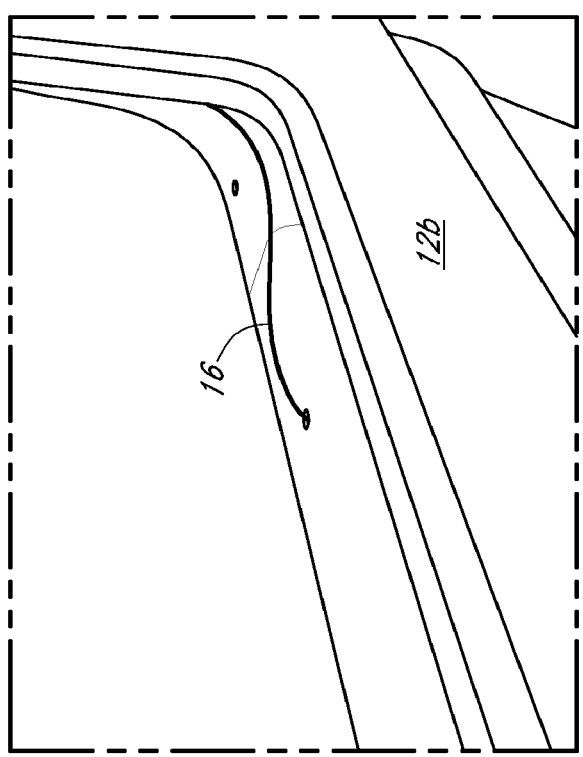
FIG. 9 is a perspective view of the vehicle shown in FIGS. 7&8 showing where various cables and/or conduits may be placed.
Figure 10:
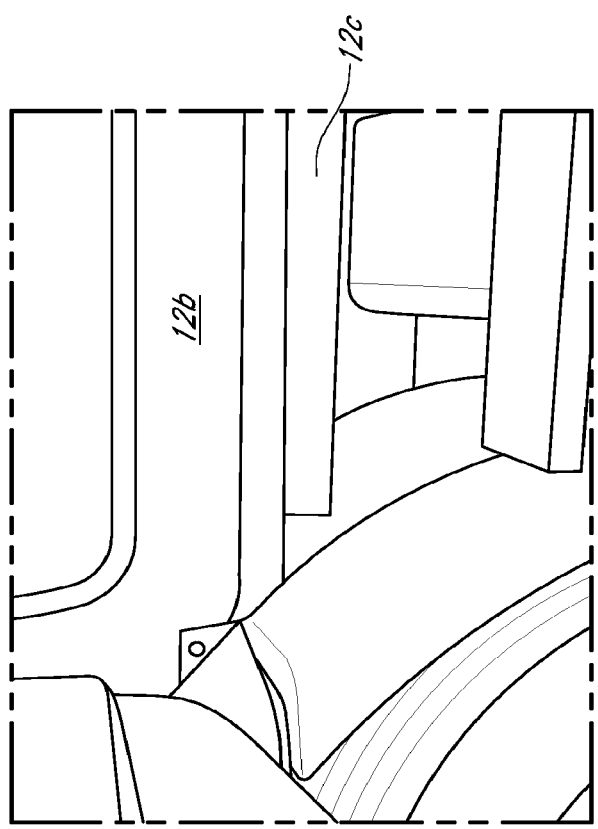
FIG. 10 is a perspective view of the vehicle shown in FIGS. 7-9 showing where one embodiment of a road surface temperature sensor may be engaged with the vehicle.
Figure 11:
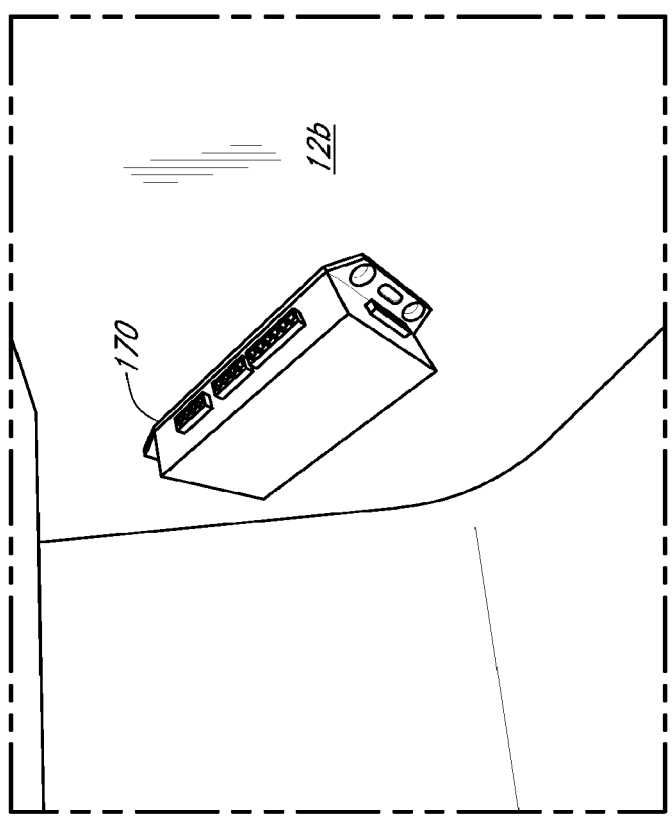
FIG. 11 is a perspective view of the vehicle shown in FIGS. 7-10 showing where one embodiment of a central controller may be engaged with the vehicle.
Figure 12:
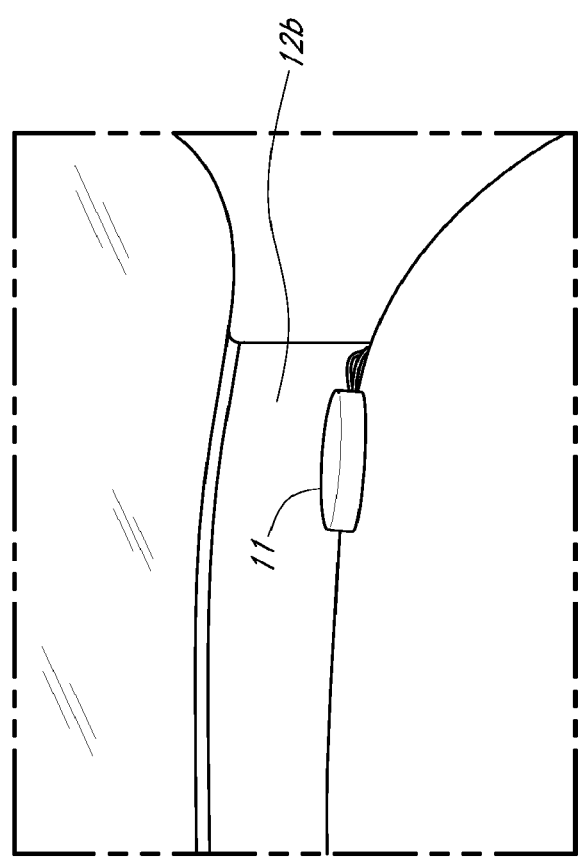
FIG. 12 is a perspective view of the vehicle shown in FIGS. 7-11 showing where one embodiment of an antenna in communication with the data collection apparatus may be engaged with the vehicle.
Figure 13:
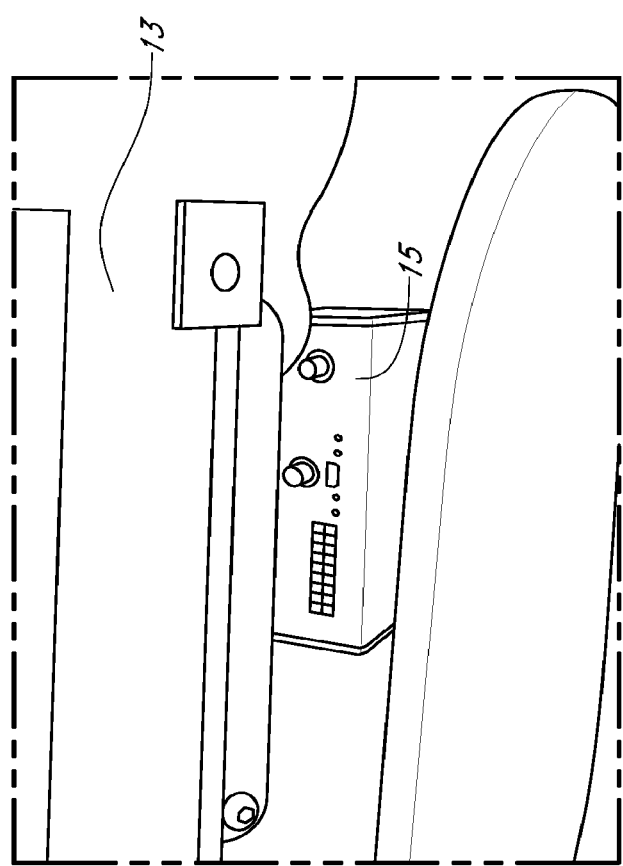
FIG. 13 is a perspective view of the vehicle shown in FIGS. 7-12 showing where another element of one embodiment of a data collection apparatus may be engaged with the vehicle.
Figure 14:
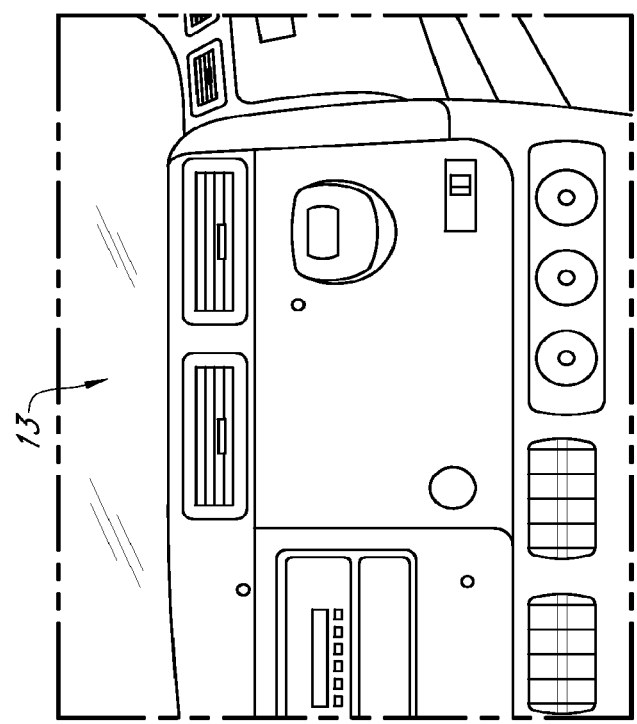
FIG. 14 is a perspective view of the interior of the vehicle shown in FIGS. 7-13.
Figure 15:
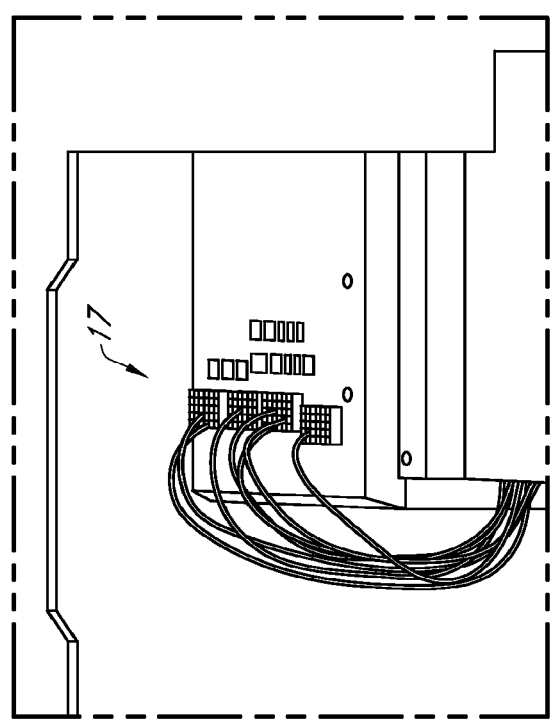
FIG. 15 is a perspective view of the vehicle shown in FIGS. 7-14 showing where various electrical connections may be made on the vehicle.

A perspective view of a vehicle having a cab 12a and a deflector 12b mounted on top thereof with which certain embodiments of a data collection method and apparatus 10 may be used is shown in FIG. 7A. FIG. 7B provides a view of that same vehicle with a main assembly 100 mounted on the top of the cab 12a adjacent the deflector 12b using mechanical fasteners. Other mounting positions and/or methods may be used without limitation. That same cab 12a is shown from the back in FIG. 8 providing and illustrative route for the conduit 16 from the main assembly 100. FIG. 9 provides a perspective view of the bottom of a door opening of the same cab 12a providing an illustrative route for the conduit 16 through a portion of the cab 12a. A perspective view of that same cab 12a from a different vantage is shown in FIG. 10, wherein a step board 12c is shown. A surface temperature sensor 50 may be positioned behind the step board. FIG. 11 provides a perspective view of an interior portion of the same cab 12a showing how an illustrative embodiment of a controller 170 may be mounted thereto. FIG. 12 provides an perspective view of that same cab 12a adjacent a fender onto which an antenna 11 may be mounted. FIG. 13 provides a perspective view an interior portion of the dash 13 of that same vehicle 12. As shown, the illustrative embodiment of a telematics unit 15 may be positioned in an interior portion of the dash 13. An indicator (not shown) may be positioned in a portion of the dash 13 shown in FIG. 14 to alert the operator of the vehicle to various conditions, such as a malfunction of the data collection method and apparatus 10 and/or any component thereof. FIG. 15 provides an illustrative embodiment of a vehicle communication/power interface 17 on an existing vehicle with which the data collection method and apparatus 10 and/or various components thereof may communicate.

Other embodiments of the data collection method and apparatus 10 and components thereof are disclosed below, as are different communication methods and structure therefor, as well as different mounting positions for the various components of the data collection method and apparatus 10. Accordingly, the scope of the data collection method and apparatus 10 as disclosed herein is in no way limited by the method and/or structure used to allow for communication between the various components of the data collection method and apparatus 10 and/or between the data collection method and apparatus 10 and an external device, nor is the scope limited by the mounting methods, structure used therefor, and/or positions of any component of the data collection method and apparatus 10.

Illustrative Embodiment of a Main Assembly

FIGS. 16A-16G provide different views of an illustrative embodiment of a main assembly 100 that may be used with various embodiments of the data collection method and apparatus 10. This embodiment of a main assembly 100 may be configured to house multiple sensors for certain embodiments of the data collection method and apparatus 10. In the embodiment shown in FIGS. 16A-16E, a precipitation sensor 150 and pyranometer 160 may be engaged with the main assembly 100 and one or more other sensors may be positioned in the interior of the main assembly 100. For example, the illustrative embodiment may include a temperature/humidity sensor 135a, lightning sensor 135b, ozone sensor 134c, and/or barometric pressure sensor 177. However, different sensors, combinations, and/or arrangements thereof may be used with the main assembly 100 without departing from the spirit and scope of the preset disclosure. For example, for certain applications of the data collection method and apparatus 10, it may be beneficial to position a barometric pressure sensor 177 in the controller 170 rather than the main assembly 100 to ensure the data is not corrupted due to airflow caused by the fan 144.

Figure 16A:
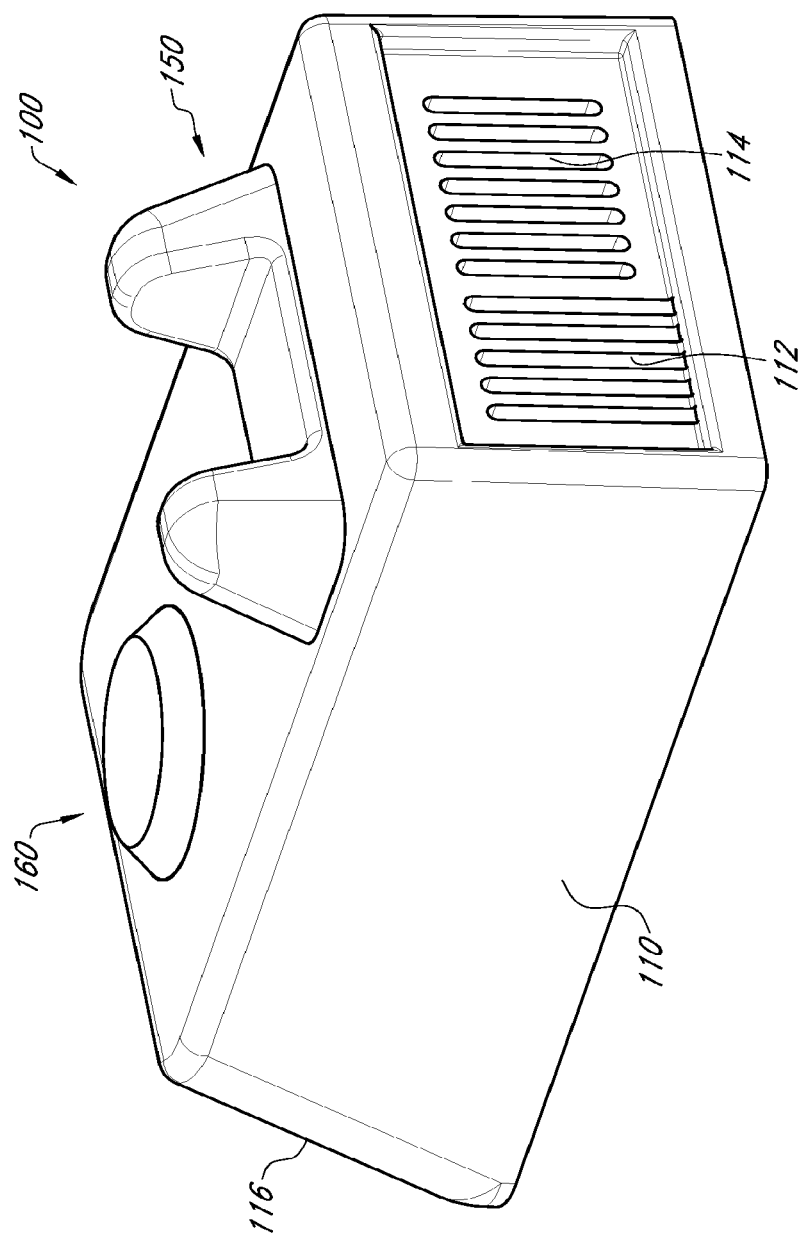
FIG. 16A is a rear perspective view of one embodiment of a main assembly that may be used with various embodiments of the data collection method and apparatus.

An illustrative embodiment of a main assembly 100 is shown from an elevated, rear perspective in FIG. 16A. As shown, an exterior housing 110 may include an inlet 112 and an outlet 114, both of which may be formed as a grille in one end of the exterior housing 110. A slope 116 may be formed in the exterior housing 110 opposite the inlet 112 and outlet 114. It is contemplated that for most applications it will be advantageous to position the main assembly 100 so that the slope 116 is oriented as the leading edge and the end of the exterior housing 110 configured with the inlet 112 and/or outlet 114 may be oriented as the trailing edge. It is contemplated that this configuration will mitigate the likelihood of erroneous readings for sensors positioned within the main assembly 100, such as a temperature/humidity sensor 135a, a lightning sensor 135b, an ozone sensor 135c, and/or an air quality sensor. Additionally, for land vehicles it is contemplated that in certain applications it may be optimal to position the main assembly 100 on the roof of the vehicle, approximately 0.5 m behind the intersection of the roof and wind screen in an area where the fluid flow over the vehicle is less turbulent.

Figure 16B:
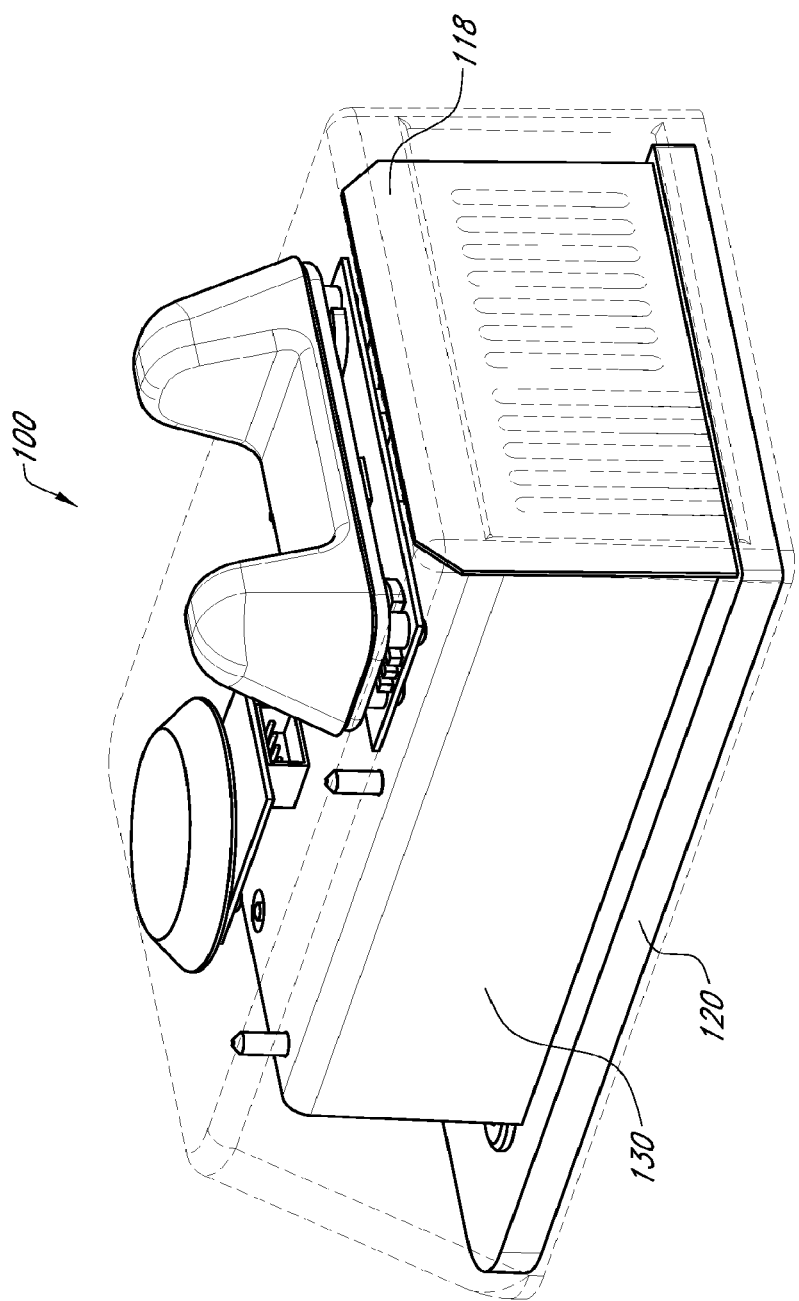
FIG. 16B is a rear perspective view of the embodiment of a main assembly shown in FIG. 16A wherein the exterior housing has been made transparent.

In FIG. 16B, the exterior housing 110 has been made transparent. Accordingly, a filter 118 is shown in FIG. 16B, which filter 118 may be constructed of a stainless steel mesh having small apertures therein, or any other material suitable for the particular application of the main assembly 100 without limitation, which material includes but is not limited to polymers or other synthetic materials, cellulosic or other natural materials, metals and their alloys, and/or combinations thereof. The filter 118 may be configured to prevent water droplets, debris, dirt, or any other potential contaminant from affecting the sensors within the main assembly 100. Any other type of filter 118 suitable for the particular application of the main assembly 100 may be used without limitation.

As shown in FIG. 16B, the exterior housing 110 may engage a base 120, such that the area internal to the exterior housing 110 is protected from the external environment, with the only ingress/egress thereto via the inlet 112 and/or outlet 114. It is contemplated that for some embodiments of the main housing 100, the base 120 may provide the engagement and/or attachment point to the vehicle. However, other configurations may be used without limitation. The base 120 may be formed with one or more extensions 122 extending upward therefrom to provide an engagement point and/or structural support to an interior member 130, as described in detail below. The base 120 may also include a baffle 124 extending upward therefrom, wherein the baffle 124 may be positioned adjacent the inlet 112 in the exterior housing 120. Accordingly, in the illustrative embodiment of a main assembly 100 shown in FIG. 16B, the baffle 124 may serve to remove any water, debris, dirt, and/or other potential contaminant that passed through the inlet 112 and/or filter 118. Finally, a communication/power interface 126 may be positioned on the exterior of the base 120 near the center thereof. The communication/power interface 126 may be configured to provide a socket to connect the main assembly 100 to a power source, conduit 16 thereto, communication component (e.g., wireless transponder), and/or conduit 16 thereto.

Figure 16C:
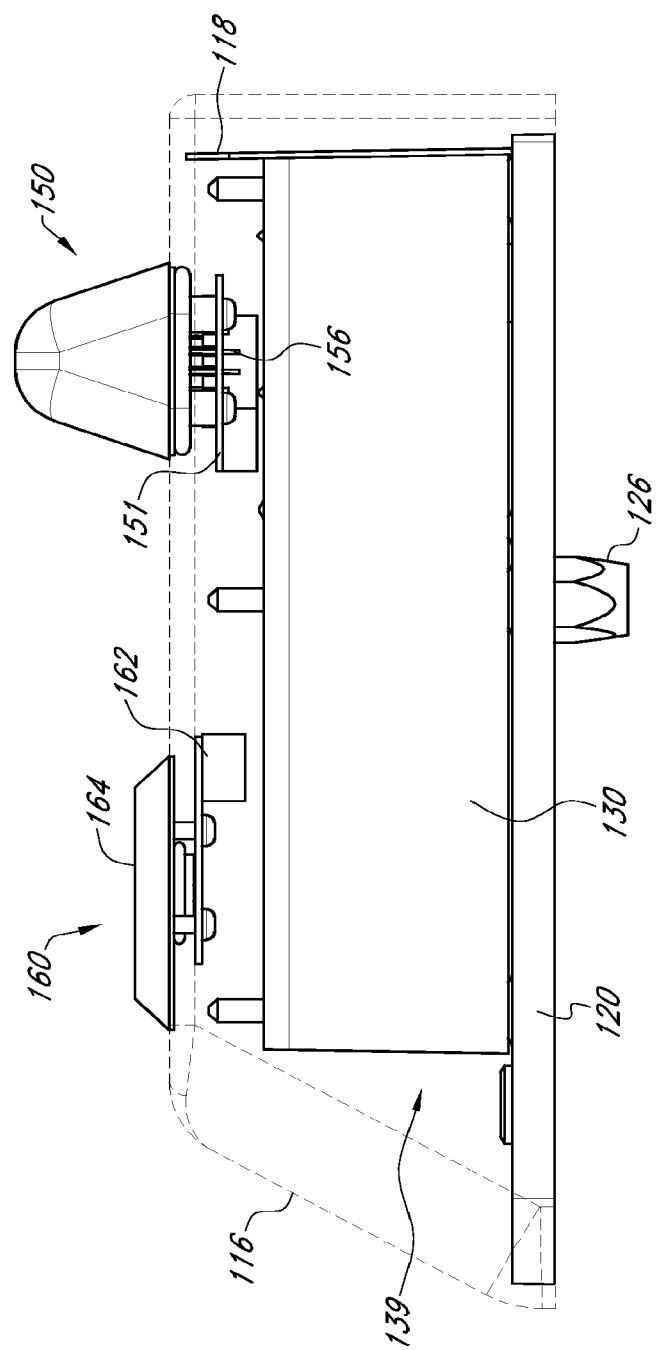
FIG. 16C is a side view of the embodiment of a main assembly shown in FIGS. 16A & 16B wherein the exterior housing has been made transparent.

A precipitation sensor 150 may be engaged with the exterior housing 110 on a top surface thereof. FIG. 16C provides a side view of an illustrative embodiment of a main assembly 100 wherein an illustrative embodiment of a precipitation sensor 150 may be engaged with the exterior housing 110 via an aperture or apertures formed in the exterior housing 110 and specifically configured for the precipitation sensor 150 such that the precipitation sensor circuitry 151 (or at least a portion thereof) may be interior with respect to the exterior housing 110. Such a configuration may protect the precipitation sensor circuitry 151 from various environmental hazards. As shown, the precipitation sensor circuitry 151 may be engaged with one or more power and data conduits 156 to allow for a power and/or communication interface between various components of the precipitation sensor 150 and/or other components of the main assembly 100. An illustrative embodiment of a precipitation sensor 150 is shown in perspective in FIG. 17 and described in detail below.

Still referring to FIG. 16C, a pyranometer 160 may also be engaged with the exterior housing 110 on a top surface thereof as shown for the illustrative embodiment of a main assembly 100. The pyranometer 160 may be engaged with the exterior housing 110 via an aperture or apertures formed in the exterior housing 110 and specifically configured for the pyranometer 160 such that the pyranometer circuitry 162 (or a portion thereof) may be interior with respect to the exterior housing 110. Such a configuration may protect the pyranometer circuitry 162 from various environmental hazards. The pyranometer 160 may be configured to sense the amount of ambient light experienced by the main assembly 100. A transparent cover 164 may be positioned exterior to the sensing unit of the pyranometer 160 to protect the sensing unit from various environmental hazards. Any suitable pyranometer 160 or other device capable of adequately measuring the amount of ambient light experienced the main assembly 100 may be used with the main assembly 100 without limitation.

Figure 16D:
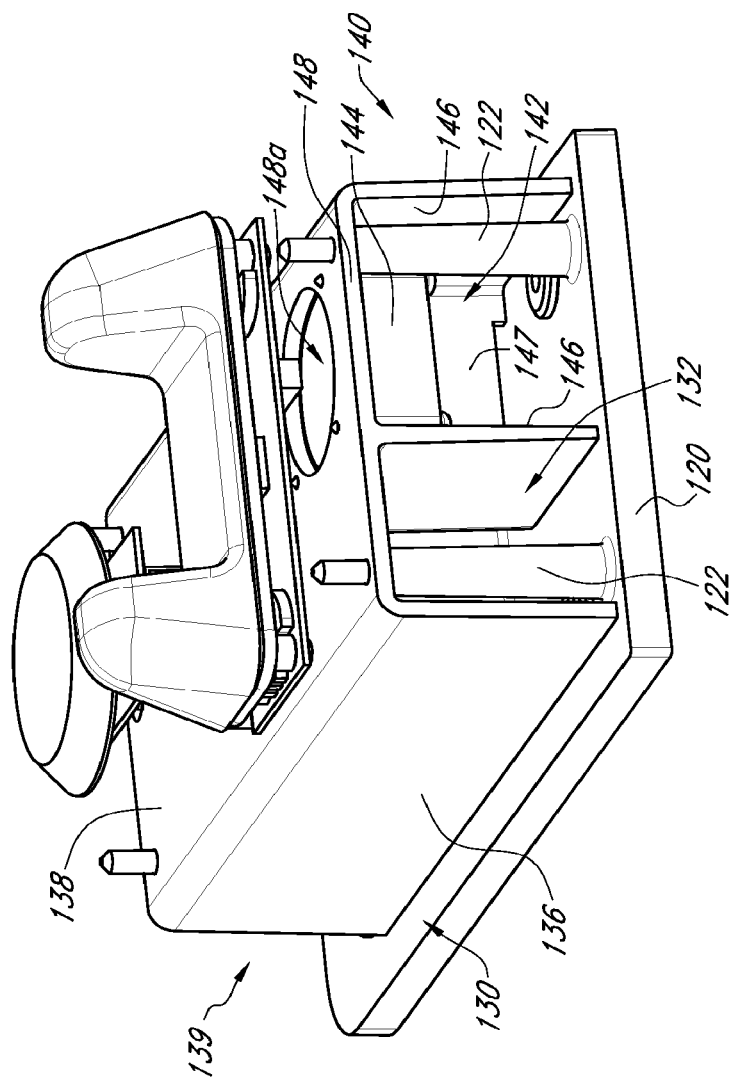
FIG. 16D is a rear perspective view of the embodiment of a main assembly shown in FIGS. 16A-16C wherein the exterior housing and filter have been removed.
Figure 16E:
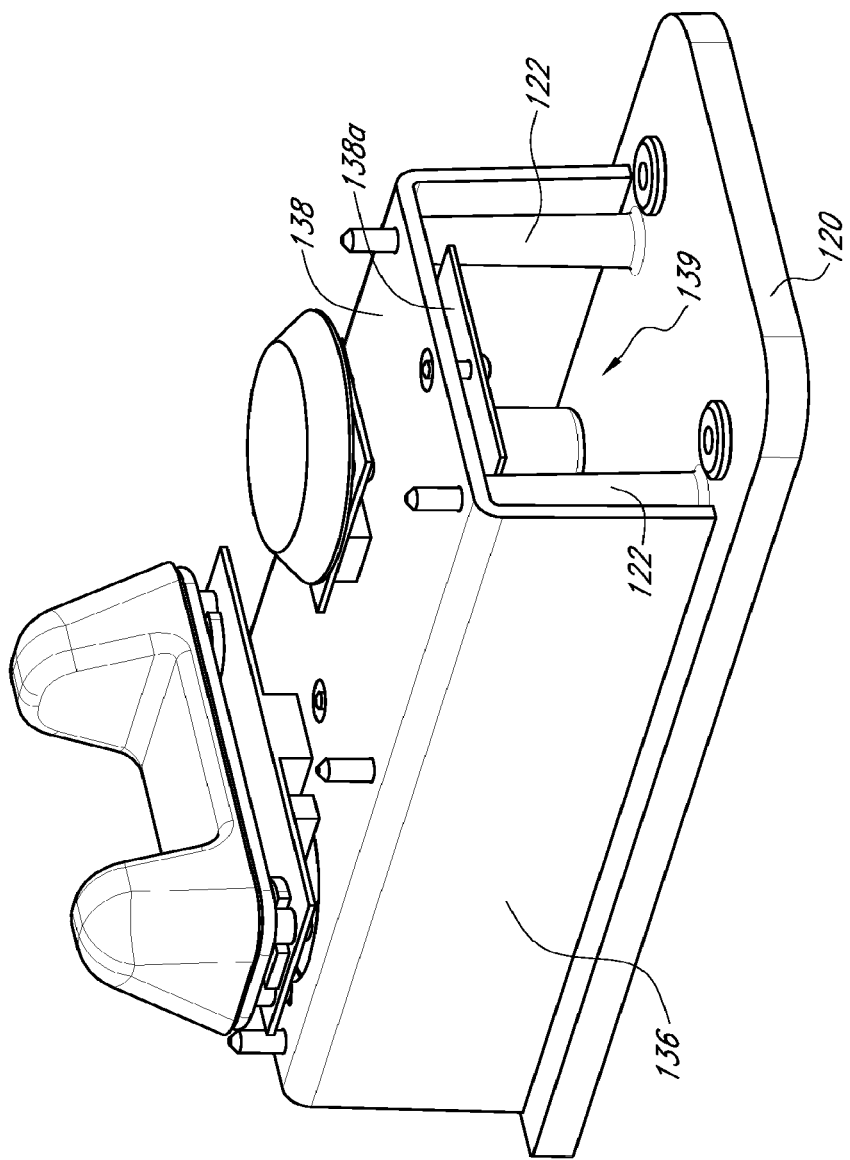
FIG. 16E is a front perspective view of the embodiment of a main assembly shown in FIGS. 16A-16D wherein the exterior housing and filter have been removed.
Figure 16F:
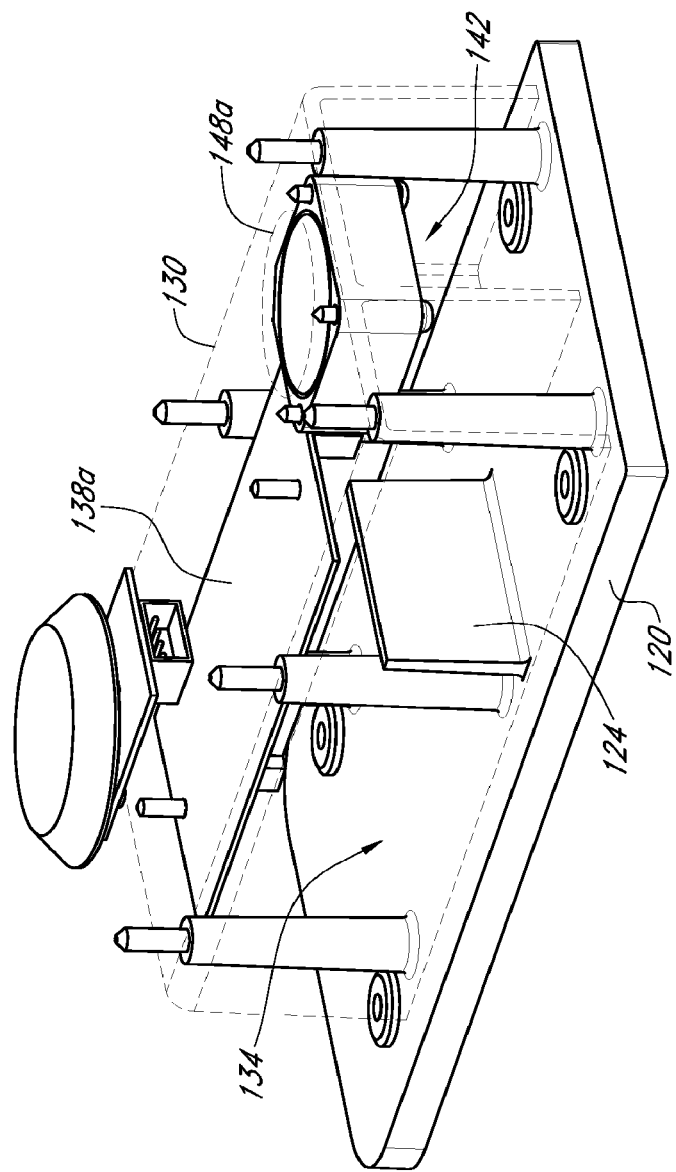
FIG. 16F is a rear perspective view of the embodiment of a main assembly shown in FIGS. 16A-16E wherein the exterior housing, filter, and precipitation sensor have been removed and the interior member has been made transparent.
Figure 16G:
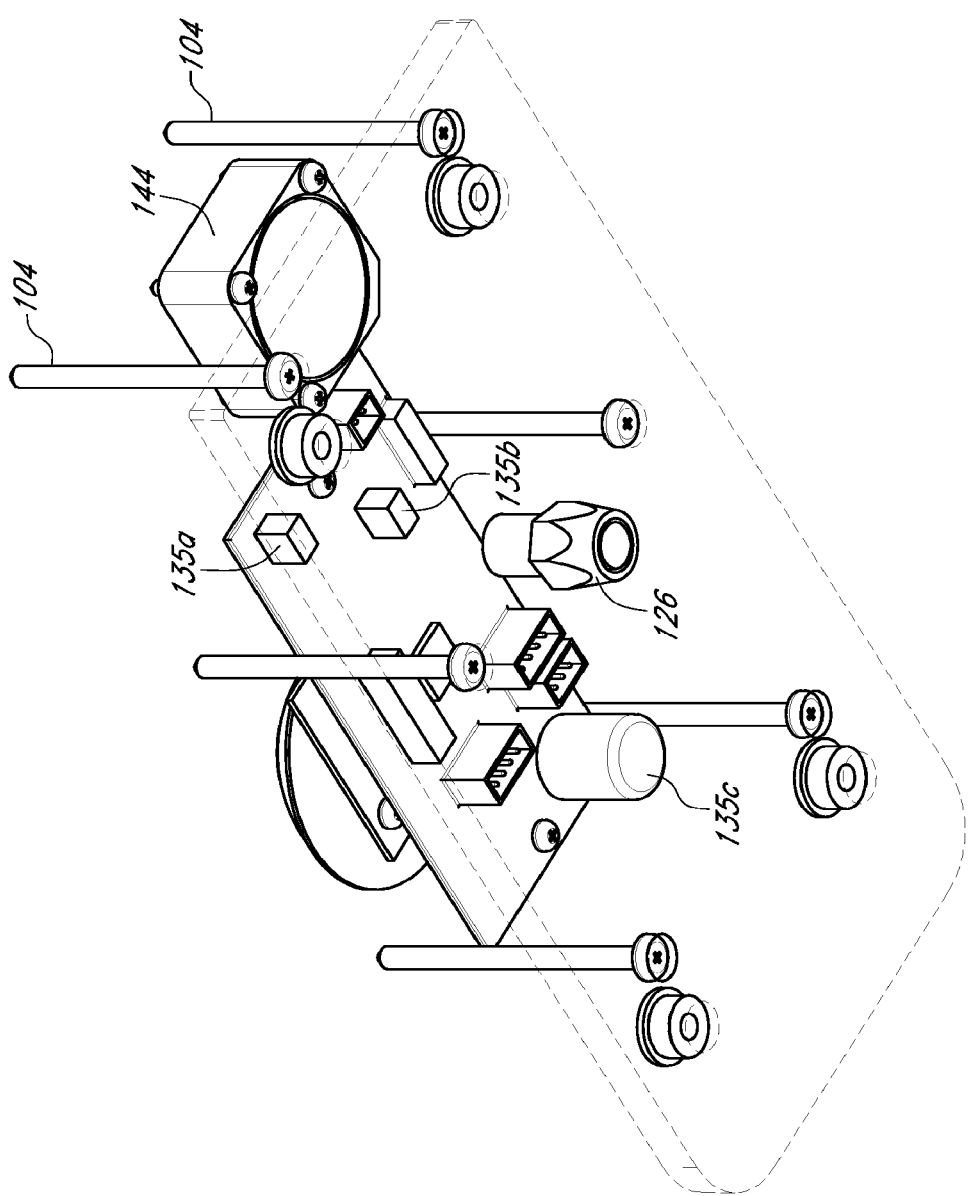
FIG. 16G is a bottom perspective view of the embodiment of a main assembly shown in FIGS. 16A-16F wherein the exterior housing, filter, and precipitation sensor have been removed and the base has been made transparent.

The main assembly 100 may include an interior member 130 positioned internally with respect to the exterior housing 110. FIG. 16D provides a rear perspective view of an illustrative embodiment of a main assembly with the exterior housing 110 and filter 118 removed for clarity, and FIG. 16E provides a front perspective view thereof. The interior member 130 may be formed with an entrance zone 132 adjacent the distal end of the baffle 124. The entrance zone 132 may lead to a main sensing chamber 134 generally along the length of the interior member 130. The main sensing chamber 134 may be fluidly connected to the entrance zone 132 and inlet 112 such that ambient air external to the main assembly 100 may enter the main sensing chamber 134.

The main sensing chamber 134 may be bound on either side by a side wall 136, on top by a top wall 138, and on the bottom by the interior surface of the base 120. The back surface of the main sensing chamber 134 opposite the entrance zone 132 may be bound by an exhaust fan housing 140, and a front opening 139 may be configured at the leading edge of the interior member 130. The front of the main sensing chamber 134 may be open and in fluid communication with an interstitial area 102 between the external surface of the interior member 130 and the internal surface of exterior housing 110. The interstitial area 102 may extend along the exterior of the sides walls 136 and top wall 138. It is contemplated that the optimal distance, relative shape, and/or configuration between the external surface of the interior member 130 and the internal surface of exterior housing 110 may vary from one application of the main assembly 100 to the next, and is therefore in no way limiting to the scope of the present disclosure. However, for some applications it may be optimal to configure the interstitial space 102 as generally rectangular, wherein the distance between the external surface of the interior member 130 and the internal surface of exterior housing 110 is between 2 and 8 mm along the side walls 136 and between 3 and 12 mm along the top wall 138. Along with serving as a duct for air passing through the main assembly 100 (as described in detail below), the interstitial area 102 may also provide insulation and/or a thermal break between the exterior housing 110 and the interior member 130. Accordingly, if the exterior housing 110 experiences heating (e.g., from solar radiation), any transmission of that heat to the main sensing chamber 134 is minimized, which Primary circuitry 138a for the main assembly 100 and various sensors positioned therein may be positioned on a printed circuit board (PCB) engaged with the interior of the top wall 138. The various sensors within the main assembly 100 may be engaged with this primary circuitry 138a and may be mounted directly on the PCB. As clearly shown in FIG. 16G, a temperature/humidity sensor 135a, a lightning sensor 135b, an ozone sensor 135c, and/or an air quality sensor (not shown) may be engaged with the primary circuitry 138a in the main assembly 100. This configuration allows moisture and/or other contaminants in the air to drop away from the primary circuitry 138a due to gravity. The primary circuitry 138a and/or other electronic and/or electrical components within the main assembly 100 and/or data collection apparatus 10 may be configured with a conformal coating.

The interior member 130 may be engaged with the extensions 122 of the base 120. A fastener 104 may pass through each extension and serve to engage the interior member 130 and/or exterior housing 110 with the base 120. However, any other engagement methods and/or structures therefor may be used with the data collection method and apparatus 10 without limitation, including but not limited to plastic tabs and corresponding recesses, bolts, chemical adhesives, and/or combinations thereof.

An exhaust fan housing 140 may be configured in the interior member 130 at the rear end of the main assembly 100 opposite the baffle 124. The exhaust fan housing 140 may be bound by a side wall 146 on either side, an end wall 147 adjacent the main sensing chamber 134. An exit zone 142 may be formed opposite the end wall 147 such that the exhaust fan housing 140 may be in fluid communication with the exterior of the main assembly 100 via the outlet 114 formed in the exterior housing 110. The filter 118 previously described may extend to the outlet 114 to mitigate contamination of the exhaust fan housing 140. A fan 140 may be engaged with the top wall 148 adjacent a fan inlet 148a that may be formed in the top wall 148. The fan 144 may be configured to provide fluid and/or air circulation to the main assembly 100 by drawing air from the interstitial area 102, through the fan inlet 148a, and out of the main assembly 100 via the exit zone 142 and outlet 114. In such a configuration, the fan 144 may be configured to provide aspiration to the entire main assembly 100, as air and/or fluid drawn from the interstitial area 102 may be replenished by air and/or fluid exiting the main sensing chamber 134 at the front opening 139, air and/or fluid drawn from the main sensing chamber 134 may be replenished by air and/or fluid entering the main sensing chamber 134 at the entrance zone 132, and air and/or fluid drawn from the entrance zone 132 may be replenished by ambient external air and/or fluid entering the main assembly 100 through the inlet 112 and filter 118.

Figure 22:
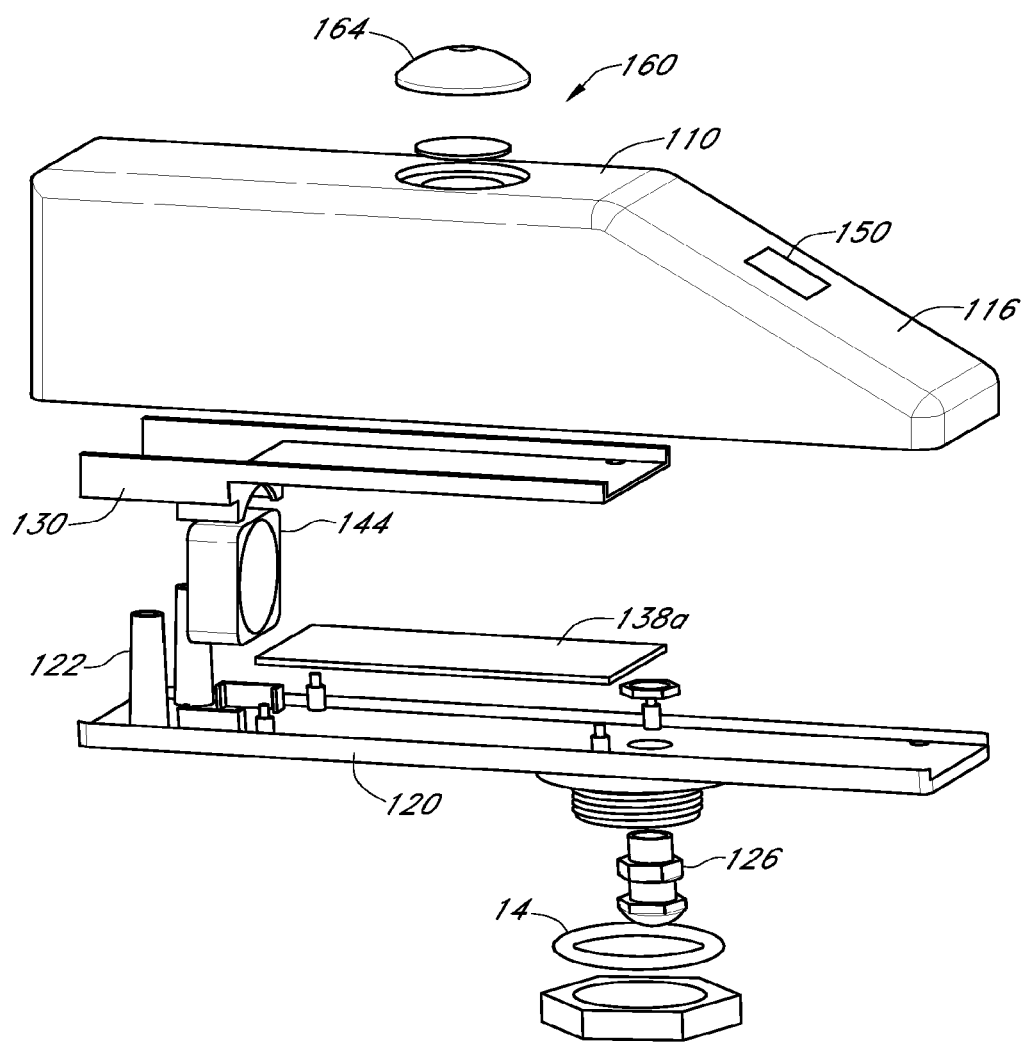
FIG. 22 is an exploded view of a second embodiment of a main assembly that may be used with various embodiments of the data collection method and apparatus.

Another illustrative embodiment of a main assembly 100 is shown in an exploded view in FIG. 22. This embodiment may function in a manner similar to that as previously described for the embodiment shown in FIGS. 16A-16G. The embodiment in FIG. 22 may include an exterior housing 110 having a slope 116 on the leading edge opposite an inlet 112 and outlet 114 on the trailing edge. The exterior housing 110 may engage a base 120 configured with one or more extensions 122 and a communication/power interface 126. A fan 144 may be positioned adjacent the outlet 114, and an interior member 130 and the base 120 may be configured to provide a main sensing chamber 134 within the main assembly 100. One or more sensors positioned in the main sensing chamber 134, and a pyranometer 160 may be engaged with the exterior housing 110 in a manner similar to that previously described.

Illustrative Embodiment of Precipitation Sensor

Figure 17:
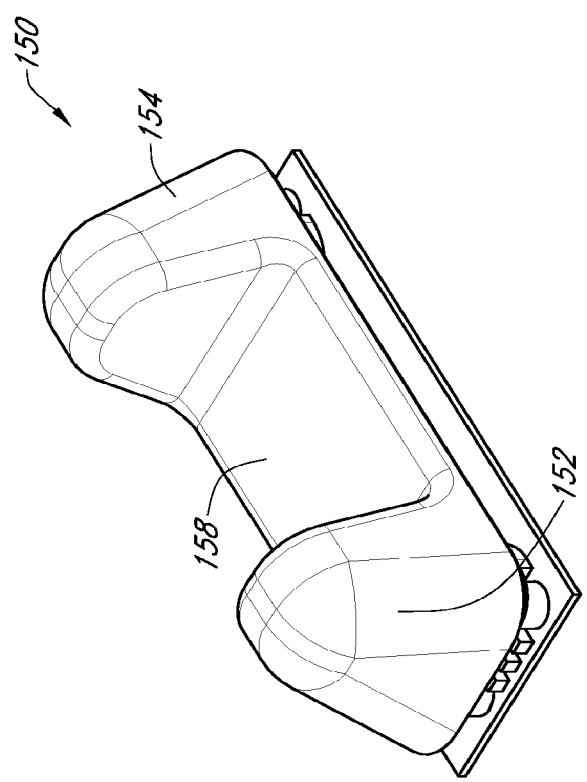
FIG. 17 is a perspective view of one embodiment of a precipitation sensor that may be used with various embodiments of the data collection method and apparatus.

A perspective view of one illustrative embodiment of a precipitation sensor 150 is shown in FIG. 17. This is the same embodiment of a precipitation sensor 150 shown engaged with the main assembly 100 in FIGS. 16A-16E. The embodiment shown in FIG. 17 may include an infrared transmitter housing 152 and an infrared receiver housing 154 opposite one another. It is contemplated that both housings 152, 154 may be transparent to IR-spectrum light. Both housings 152, 154 may be attached to or integrally formed with a precipitation sensor base 158. The precipitation sensor base 158 may provide a housing for the precipitation sensor circuitry 151 required for operation of the precipitation sensor 150, which circuitry 151 is described in detail below. Additionally, a portion of the precipitation sensor circuitry 151 may be protected by the exterior housing 110 of the main assembly 100 as previously described. As described below, the illustrative embodiment of a precipitation sensor 150 obviates the need for a clearing mechanism (e.g., wiper blade, etc.) to accurately detect current precipitation by detecting the transient effect of droplets passing through a beam.

The illustrative embodiment of a precipitation sensor 150 may include a clear precipitation sensor base 158 with two raised areas protruding therefrom—an IR transmitter housing 152 with a transmitter positioned therein and an IR receiver housing 154 with a receiver positioned therein. The housings 152, 154 may be configured such that there is an open channel therebetween. The transmitter may be configured to emit a narrow beam of infrared light directly at the receiver. The receiver may detect and filter the signal level from the receiver before being processed by a microprocessor, which may be located precipitation sensor circuitry 151, which may be positioned in or near the precipitation sensor base 158. A system of automatic adjustment of emitter power may be incorporated to compensate for any build-up of dirt, which could influence the received intensity of the IR beam in the absence of any precipitation.

Moisture droplets passing through the beam will produce a reduction in received signal. This reduction may be used to provide an indication of precipitation level. It has been observed that moisture in the form of single large droplets produces a different characteristic signal to that from small, dispersed droplets. The precipitation sensor 150 is thus able to provide an indication of the precipitation type as well as intensity. Infrared light may be used rather than visible light to minimize the potential interference caused by sunlight incident on the receiver. The microprocessor may be configured with built-in calibration routines to counter long-term degradation in function and/or reliability of the transmitter and/or receiver, and/or reduction in the levels of light the receiver detects caused by surface degradation of the IR transmitter housing 152 and/or IR receiver housing 154 and/or accumulations of surface contamination on the precipitation sensor 150.

The precipitation sensor base 158, IR transmitter housing 152, and IR receiver housing 154 may be constructed of a material with high transparency to the transmitted wavelength and may, or may not, be transparent to other wavelengths of light. The illustrative embodiment of the precipitation sensor 150, and specifically the use of IR-spectrum wavelengths, has evolved from multiple studies of the problems associated with contact-type precipitation sensors such as contact bridging by ice or airborne debris. Reflectance type sensors are similarly affected. Various transmitter wavelengths were explored and the use of visible wavelengths discarded due to susceptibility to interference from sunlight incident on the receiver and the obvious visibility of the beam.

Illustrative Embodiment of Wind Sensor

Figure 18A:
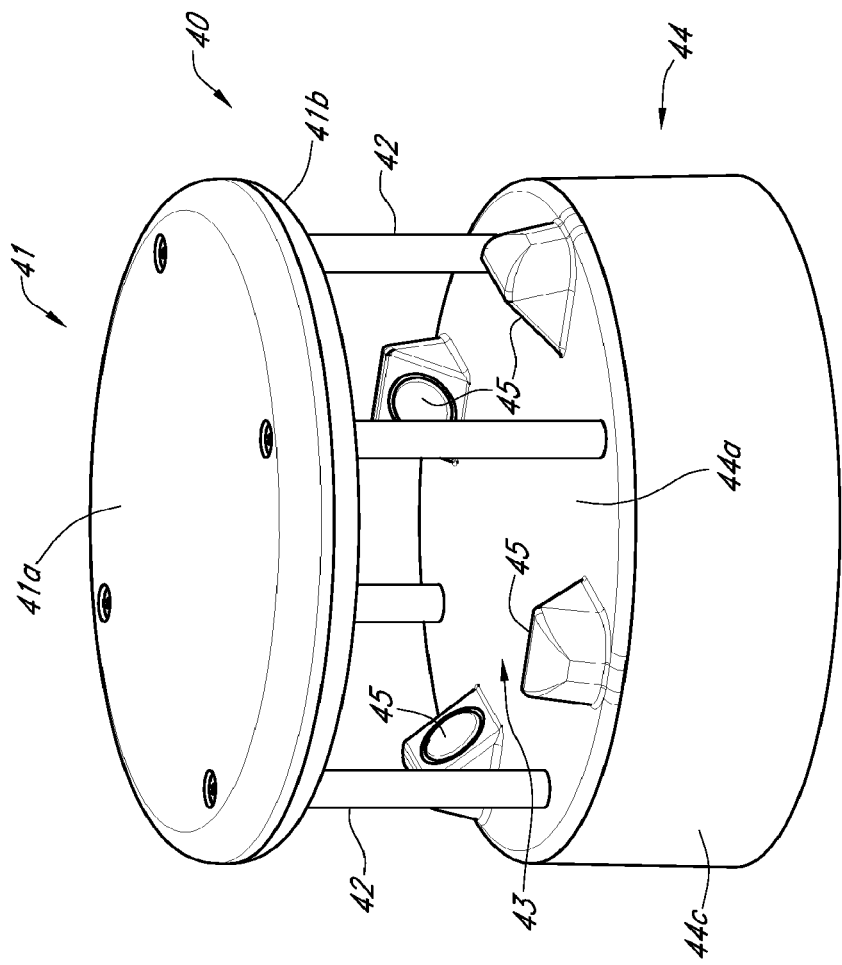
FIG. 18A is a top perspective view of one embodiment of a wind sensor that may be used with various embodiments of the data collection method and apparatus.
Figure 18B:
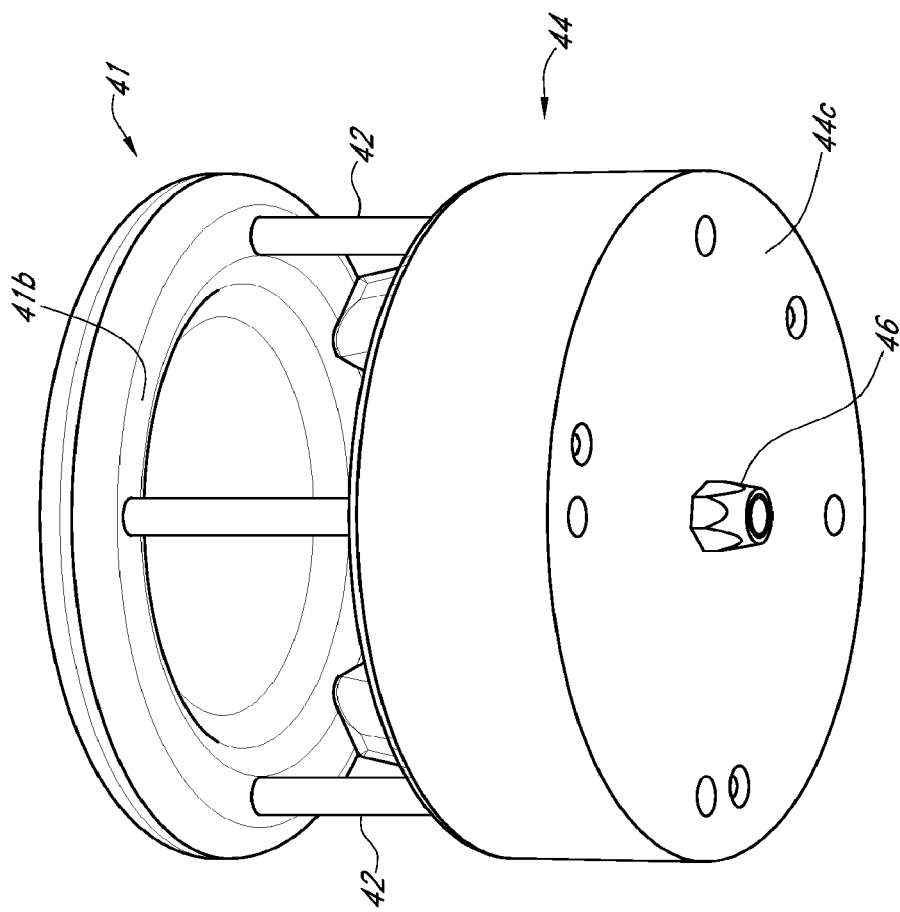
FIG. 18B is a bottom perspective view of one embodiment of a wind sensor shown in FIG. 18A.

A perspective view of an illustrative embodiment of a wind sensor 40 is shown from the top in FIG. 18A and the bottom in FIG. 18B. Generally, the illustrative embodiment of a wind sensor 40 may include a top portion 41 and a bottom portion 44. The top portion 41 may be engaged with one or more spacers 42 at a first end of the spacer 42 and the bottom portion 44 may be engaged with one or more spacers 42 at a second end of the spacer 42 to create a void 43 between the top portion 41 and bottom portion 44. A communication/power interface 46 may be positioned on the bottom side of the bottom portion 44, which is clearly shown in FIG. 18B.

Figure 18C:
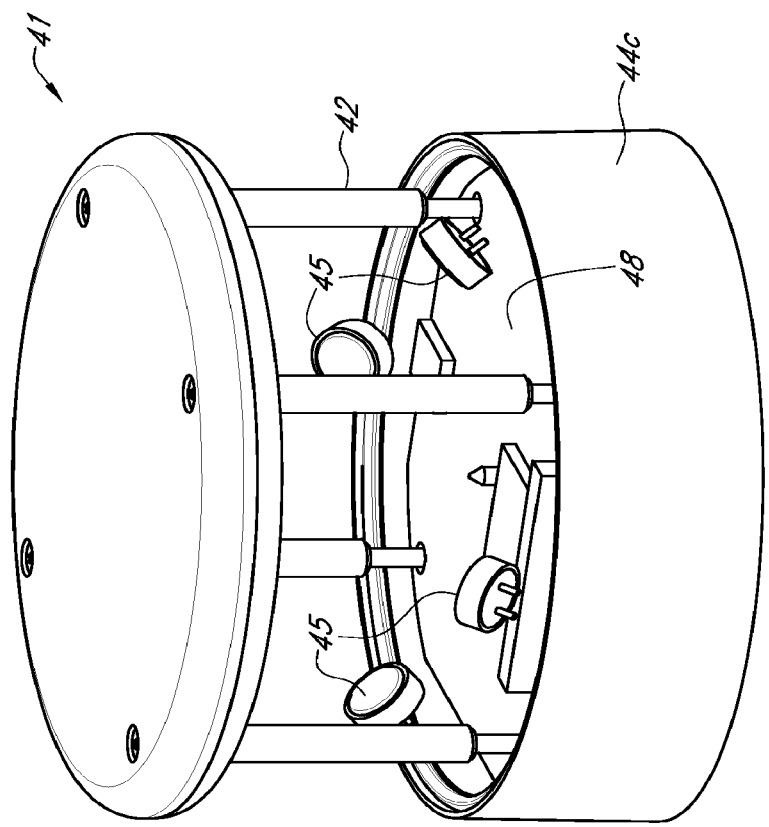
FIG. 18C is a top perspective view of the embodiment of the wind sensor shown in FIGS. 18A & 18B wherein the bottom portion cover has been removed.
Figure 18D:
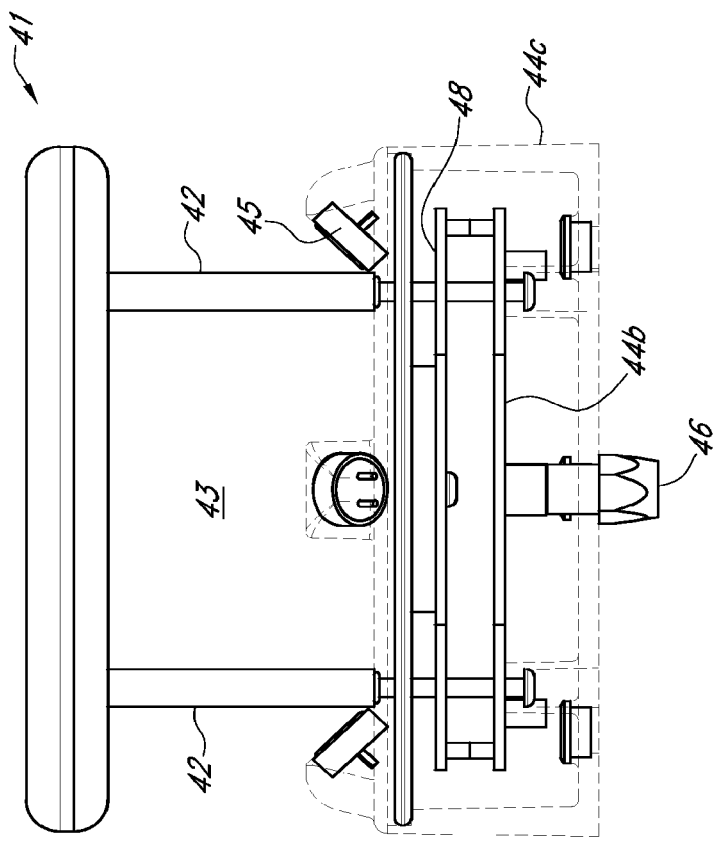
FIG. 18D is a side view of the embodiment of the wind sensor shown in FIGS. 18A-18C wherein the cup of the bottom portion cover have been made transparent.

The top portion 41 may include a top portion cover 41a and a top portion base 41b, which may be engaged with one another. The bottom portion 44 may include a bottom portion cover 44a and a cup 44c, which also may be engaged with one another. The illustrative embodiment of a wind sensor 40 is shown with the bottom portion cover 44a removed in FIG. 18C, and FIG. 18D provides a side view of that embodiment with the cup shown as transparent. One or more ultrasonic sensors 45 may be positioned on the bottom portion cover 44a, and the illustrative embodiment of the wind sensor 40 includes four ultrasonic sensors 45 arranged in two pairs. As shown in FIG. 18D, GPS/communication circuitry 48 may be positioned within the cup 44c and positioned above ultrasonic circuitry 44b to ensure GPS coordinates are accurate and minimize potential interference. It is contemplated that for some applications, the optimal position of the wind sensor 40 will be on the roof of a vehicle 12. However, the location of the wind sensor 40 does not limit the scope of the present disclosure in any way.

One problem with conventional rotating cup and wind direction vane sensors is that they will not function correctly when placed on a mobile platform once the speed of the platform exceeds a few meters per second. Ultrasonic wind speed and direction sensors exist but they rely on the transit time for a sound wave to travel from source to receiver. The faster the wind speed the shorter the time. To keep the path length short and minimize sensor size there is an effective top limit of 70 m/s on measured speed. This may be satisfactory for a fixed station, but a mobile weather system must function when a vehicle is travelling at 40 m/s into a head wind of 50 m/s, which produces a relative speed of at least 90 m/s. This wind sensor 40 may utilize the change in frequency of a sound wave at a receiver with speed to determine the wind speed and direction.

The illustrative embodiment of a wind sensor 40 comprises a bottom portion 44 housing ultrasonic sensors 45 configured as transmitter and receiver pairs. One pair may be arrange parallel to the axis of the vehicle and the other pair may be normal thereto. The transmitter may emit a known frequency, which may be received by the receiver. The received frequency may be compared with that emitted and the difference therein may be determined via the ultrasonic circuitry 44b. Movement of the wind sensor 40 and wind speed may affect the time taken for a single cycle of the transmitted signal to be received and produce a shift in frequency known as Doppler Shift. Two frequency shifts, one in the direction of travel, and one normal to it, may be determined via the ultrasonic sensor 45 configuration using the ultrasonic circuitry 44b. To determine the wind speed and direction it may be necessary to know the vehicle speed and magnetic heading. This may be obtained by utilization of a built in (or separate) GPS receiver, which may be integrated into the GPS/communication circuitry 48 in the illustrative embodiment. Alternatively an electronic compass may be utilized to obtain the heading, and data from the vehicle systems used to determine the speed. These two sets of data may be used to determine the actual wind speed and direction. Data may be validated and scaled within the wind sensor 40 via the ultrasonic circuitry 44b to minimize data errors. Data from the wind sensor 40 may be relayed to a telematics unit 15, which may be integrated into the wind sensor 40 or which may be an external device, where GPS location and time of collected data may be added and the full data packets may transmitted to another location for further processing and/or storage.

Illustrative Embodiment of a Road Temperature Sensor

Figure 19A:
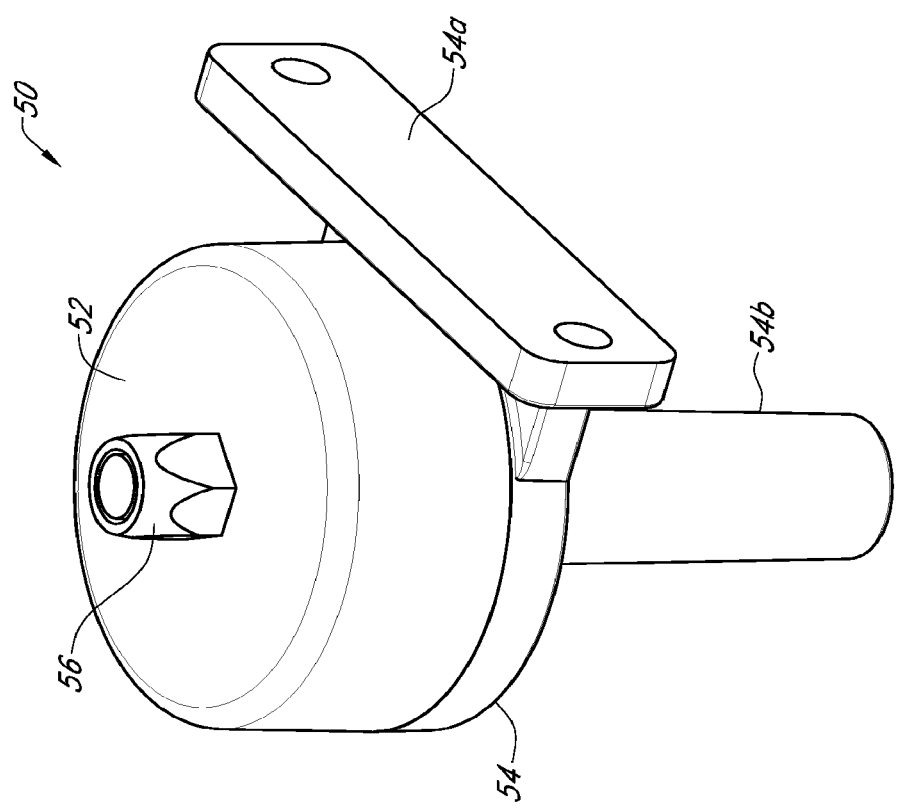
FIG. 19A is a top perspective view of one embodiment of a surface temperature sensor that may be used with various embodiments of the data collection method and apparatus.
Figure 19B:
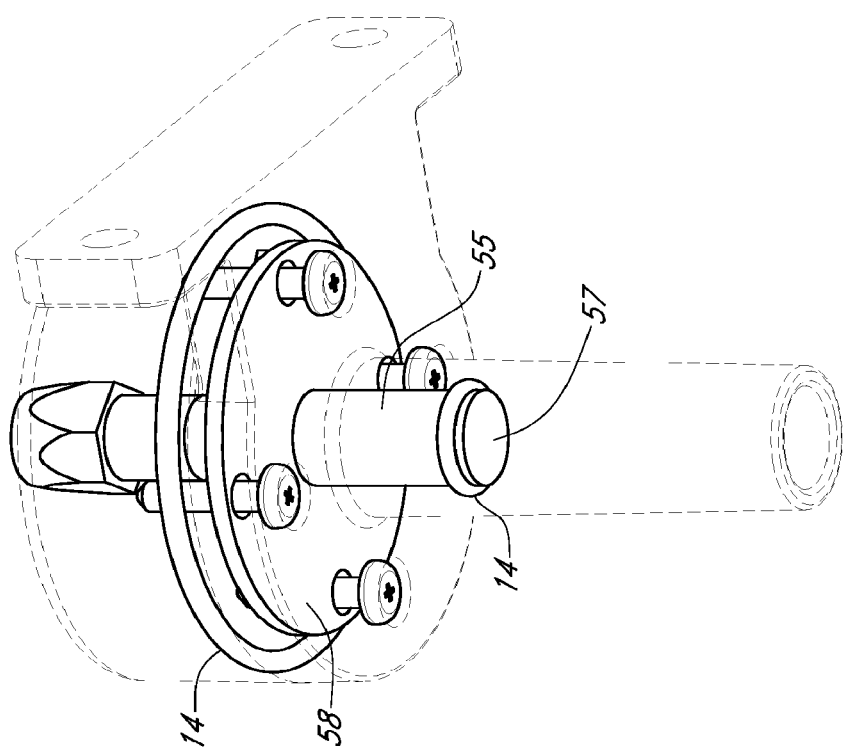
FIG. 19B is a bottom perspective view of the embodiment of a surface temperature sensor shown in FIG. 19A wherein the cover has been removed and the base has been made transparent.

An elevated perspective view of a first illustrative embodiment of a surface temperature sensor is shown in FIG. 19A and a bottom perspective view thereof is shown in FIG. 19B. The first illustrative embodiment of a surface temperature sensor 50 may include a cover 52 and a base 54, which may be selectively engageable with one another. A seal 14 may be positioned between the cover 52 and base 54 to ensure no contaminants enter the interior of the surface temperature sensor 50 at the interface therebetween. The cover 52 may be formed with a communication/power interface 56.

The base 54 may include a mounting bracket 54a and a hood 54b, both of which may be integrally formed with the base 54 or which may be separately formed and later engaged with the base 54. It is contemplated that the mounting bracket 54a may provide a convenient place to attach the surface temperature sensor 50 to a vehicle, but any attachment method and/or structure may be used without limitation. Surface temperature sensor circuitry 58 may be positioned within the base 54, which is clearly shown in FIG. 19B in which the base has been made transparent.

A thermometer 55 may be positioned adjacent the proximal end of the hood 54b and engaged with the surface temperature sensor circuitry 58. It is contemplated that the hood 54b may have a slight taper (e.g., one degree) along its length in certain embodiments depending on the method of manufacture of the hood 54b, which taper may ease removal of the hood 54b from a mold. One or more lenses 57 may be positioned in the hood 54b distally with respect to the thermometer 55 to minimize any sunlight reaching the thermometer 55. Additionally, if a lens 57 is positioned between the thermometer 55 and the distal end of the hood 54b, the amount of contaminants reaching the lens 57 may be reduced, yielding a more accurate reading. A seal 14 may be positioned around the periphery of the lens 57 to ensure no contaminants pass between the periphery of the lens 57 and the hood 54b.

It is contemplated that for some applications it may be optimal to mount the surface temperature sensor 50 approximately 0.5 m above the surface toward which the thermometer is directed, as this distance results in the thermometer 55 measuring a disk of approximately 100 mm in diameter. In land vehicles this surface would oftentimes be a road surface, which may be pavement, brick, gravel, dirt, concrete, asphalt, rock, combinations thereof, and/or any other surface that a vehicle may traverse. It is also contemplated that a length of 55 mm may be optimal for the hood 54b in certain applications.

Figure 21:
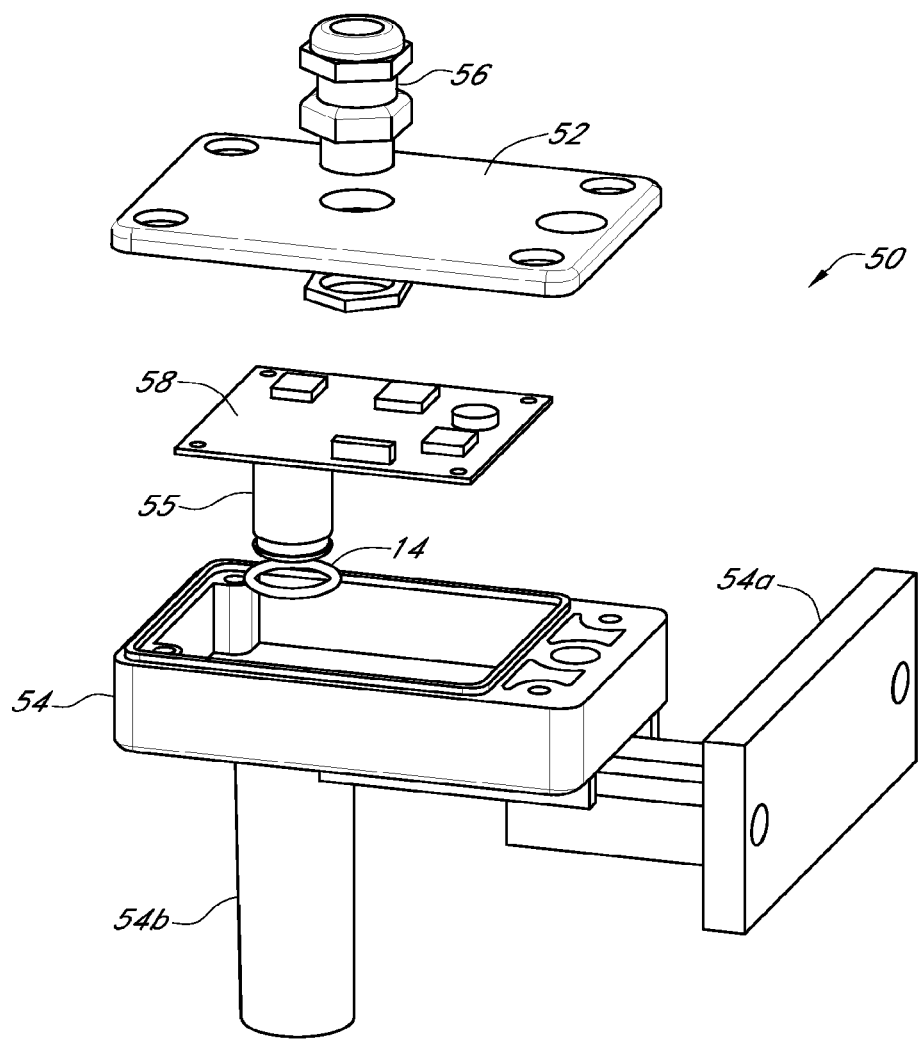
FIG. 21 is an exploded view of a second embodiment of a surface temperature sensor that may be used with various embodiments of the data collection method and apparatus.

Another embodiment of a surface temperature sensor 50 is shown in FIG. 21, which provides an exploded view of that embodiment. As with the first embodiment, the second embodiment of a surface temperature sensor 50 may include a cover 52 and base 54 selectively engageable with one another. The cover 52 may be formed with a communication/power interface 56 therein, and the base 54 may be formed with a mounting bracket 54a and a hood 54b. Surface temperature circuitry 58 may be positioned in the base 54, and a thermometer 55 and one or more lenses 57 may be positioned adjacent the proximal end of the hood 54b.

Illustrative Embodiment of a Controller

Figure 20A:
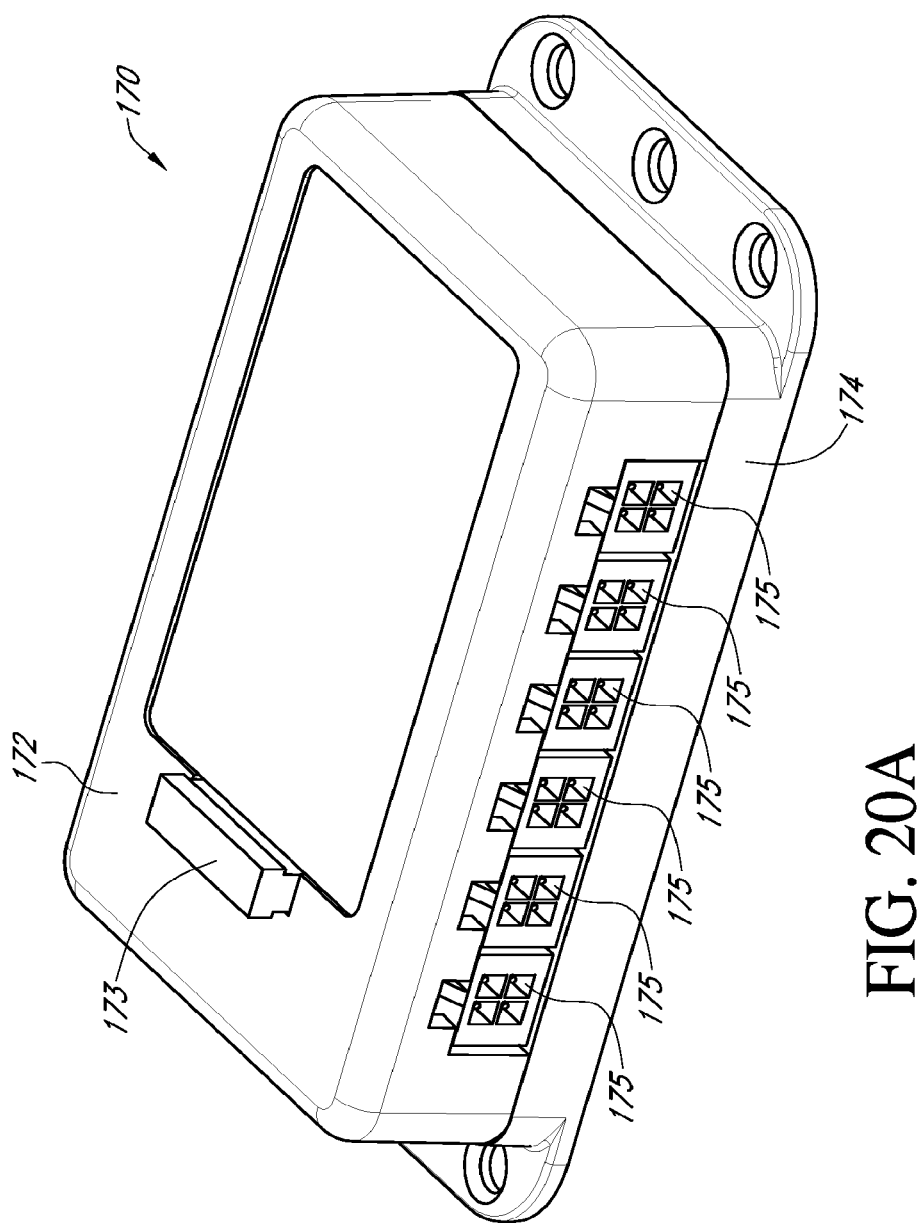
FIG. 20A is a perspective view of one embodiment of a controller that may be used with various embodiments of the data collection method and apparatus.
Figure 20B:
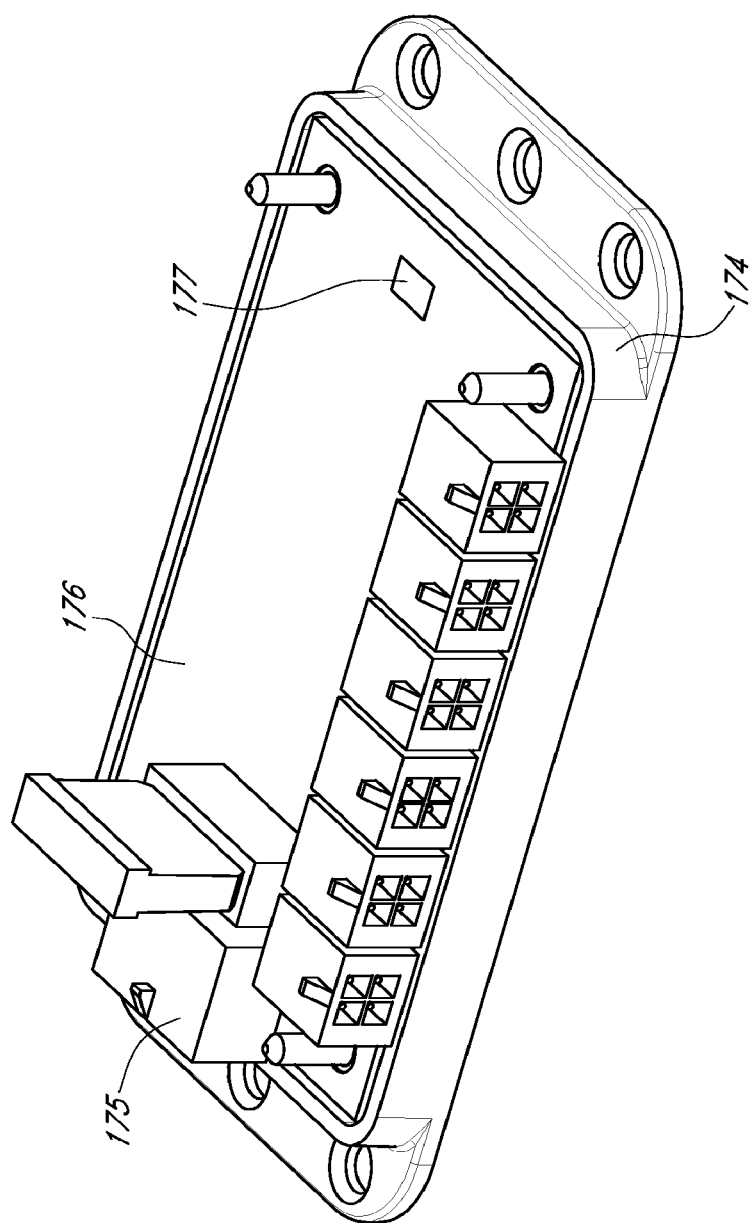
FIG. 20B is a perspective view of the embodiment of a controller shown in FIG. 20A wherein the controller housing has been removed.

An illustrative embodiment of a controller that may be used with certain embodiments of a data collection method and apparatus 10 is shown in perspective in FIG. 20A. The controller 170 may include a controller housing 172, which may be engaged with a base 174. The illustrative embodiment of the controller 170 is shown in FIG. 20B with the controller housing 172 removed. It is contemplated that in many applications it may be optimal to power the controller 170 with electrical power from the vehicle. The controller 170 may be configured as a data hub for the data collection method and apparatus 10, such that all data flows through the controller 170. Alternatively, data from only certain components of the data collection apparatus 10 may pass through the controller 170, and other components of the data collection apparatus 10 may be autonomous or semi-autonomous. In either configuration, the controller 170 may be in communication (either wired or wirelessly) with all or some of the sensors present in that specific embodiment of a data collection apparatus 10. It is contemplated that the controller 170 may be configured with all the necessary vehicle interference suppression devices and/or programs to ensure data is accurate.

The controller 170 may include controller circuitry 176, which may comprise a microprocessor, to provide the desired functionality of the controller 170 for the specific embodiment of a data collection apparatus 10. A barometric pressure sensor 177 may also be engaged with the controller circuitry 176 to sense and/or read the atmospheric pressure experienced by the controller 170. It is contemplated that this data will be useful in most embodiments of the data collection method and apparatus 10.

The controller 170 may be configured to control various other components of the data collection apparatus 10. For example, the controller 170 and main assembly 100 may be configured so that the controller 170 dictates when and at what rate the temperature/humidity sensor 135a in the main assembly 100 makes a reading and which of and at what rate those readings are recorded. The controller 170 may be configured to dictates these operational parameters to any other component in the data collection apparatus 10, or certain components (e.g., surface temperature sensor 50, wind sensor 40, etc.) may be configured to control the rate at which they make a reading and which of and at what rate those readings are recorded. Alternatively, different components may operate independently from the controller 170 under normal conditions, and operate under the direction of the controller 170 in the event of an abnormality, anomaly, malfunction, and/or other uncommon event. Each individual component may be configured to monitor the data that it reads, and it may be configured to notify the controller 170 is any uncommon event is likely to occur, is occurring, or has occurred.

The illustrative embodiment of a controller 170 shown in FIGS. 20A and 20B may include one or more communication/power interfaces 175 along one or more sides thereof. The embodiment pictured herein comprises six communication/power interfaces 175 along the length of a first side. It is contemplated that these communication/power interfaces 175 may be optimally used to communicate data and/or provide power between the controller 170 and various sensors, including but not limited to the sensors positioned in the main assembly 100, a wind sensor 40, a surface temperature sensor 540, a pyranometer 160, and/or a precipitation sensor 150. The embodiment pictured herein also comprises a communication/power interface 175 on one end thereof adjacent a fuse 173. It is contemplated that this communication/power interface may be optimally used to communication data and/or provide power between the controller and a telematics unit 15 and/or existing devices on a vehicle.

The controller 170 may be in communication with a telematics unit 15 on the vehicle 12. A telematics unit 15 may be in communication with the existing vehicle information and/or diagnostic system, and it may use data therefrom to increase the accuracy of atmospheric data or make corrections thereto. Alternatively, if the data collection apparatus 10 includes a wind sensor 40 such as the illustrative embodiment previously described herein, the controller 170 may employ the wind sensor 40 and associated GPS/communication circuitry 48 therein to receive data that would typically come from a telematics unit 15 (e.g., GPS location data, time, speed, altitude, etc.) and to communicate data remotely. It is contemplated that the remote data communication may be performed via any suitable method using any structure suitable for the method chosen, including but not limited to 2G, 4G, or LTE wireless communication methods.

Regardless of whether the data collection apparatus 10 is in communication with an existing telematics unit 15 or if the data collection apparatus 10 employs a component therein having the necessary functionality of a telematics unit 15 (e.g., through GPS/communication circuitry 48 in a wind sensor 40), the controller 170 may direct a telematics unit 15 (or similarly functional component) to communicate data (to an external device, including but not limited to a database) from one or more components of the data collection apparatus 10 (e.g., wind sensor 40, surface temperature sensor 50, barometric pressure sensor 177, temperature/humidity sensor 135*a*, lightning sensor 135*b*, ozone sensor 135*c*, etc.) outside the regular reporting schedule and/or reporting intervals for which the controller 170 and/or telematics unit 15 is configured. It is contemplated that this change of reporting schedule and/or reporting intervals may be triggered via adaptive interval sensing as previously described herein.

In an illustrative embodiment of a data collection apparatus 10, the main sensor assembly 100 may include a temperature/humidity sensor 135*a*, a lightning sensor 135*b*, an ozone sensor 135*c*, and an air quality sensor; the controller 170 may include a barometric pressure sensor 177 as described above, and a surface temperature sensor 50 and a wind sensor 40 may be included as distinct structures. However, the scope of the present disclosure is not so limited and extends to different combinations of various sensors in one or more housings without limitation.

Illustrative Embodiments of Communication/Power/Control Schemes

Figure 23:
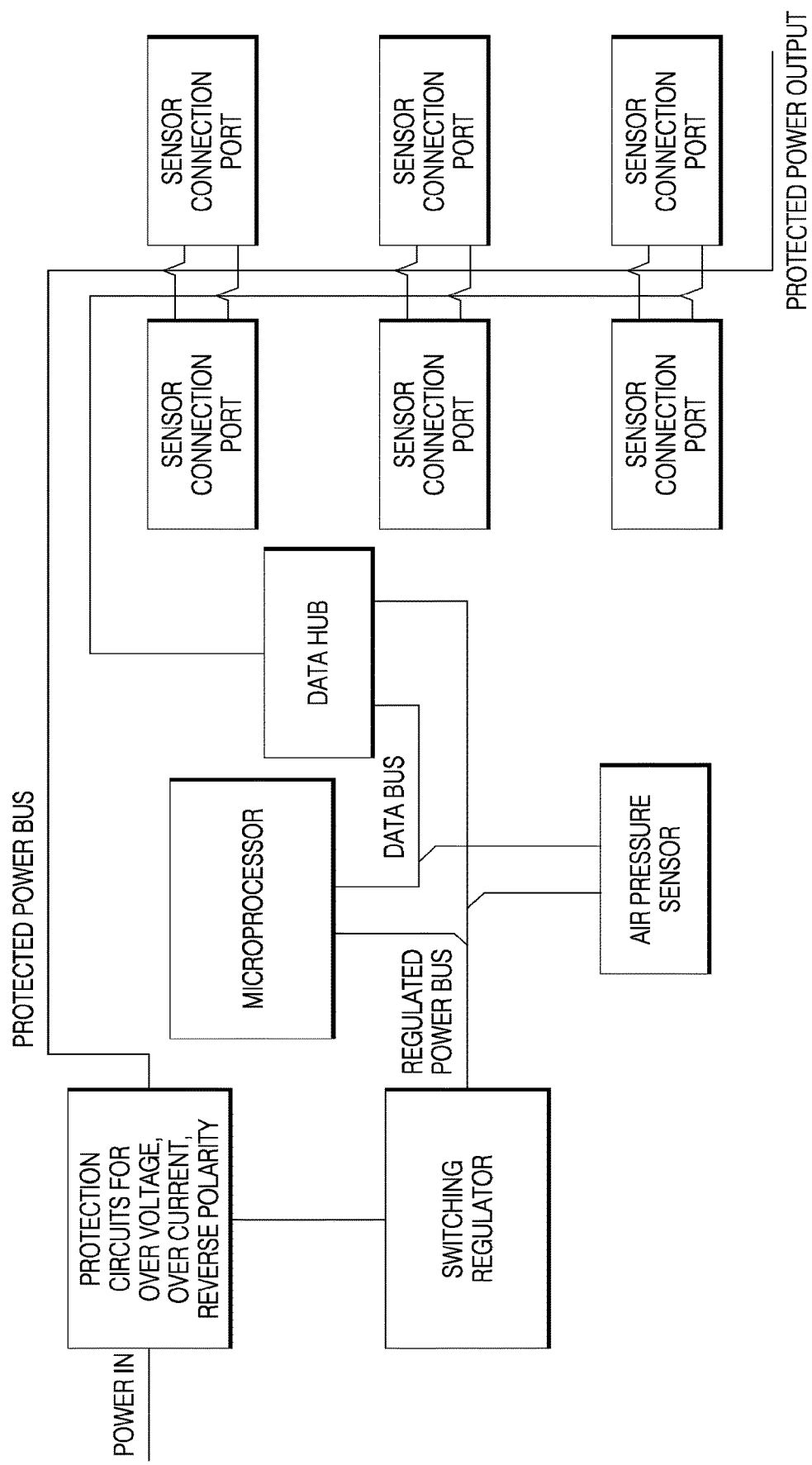
FIG. 23 is a block schematic of one embodiment of a data collection unit.

An illustrative embodiment of one method of providing power and/or data connections to the illustrative embodiment of a controller 170 shown in FIGS. 20A & 20B and various components thereof is shown schematically in FIG. 23. As shown, this embodiment of a controller 170 may be configured to receive power from an external source, which source may include but is not limited to existing devices and/or systems of a vehicle. However, other sources of power and/or other communication methods may be used without limitation. A switching regulator may be required to remove power spikes and other irregularities from the power source and to provide electricity at a lower voltage, which lower voltage may be required for the controller circuitry 176. A fuse 173 may be employed to protect other components of the data collection apparatus 10 (e.g., main assembly 100, surface temperature sensor 50, wind sensor 40, etc.) from over voltage, over current, reverse polarity, and/or other undesirable conditions. As shown, the controller 170 and controller circuitry 176 may be configured to provide regulated power and a data bus to a plurality of communication/power interfaces 175, which communication/power interface 175 may be configured as a sensor connection port.

Figure 24:
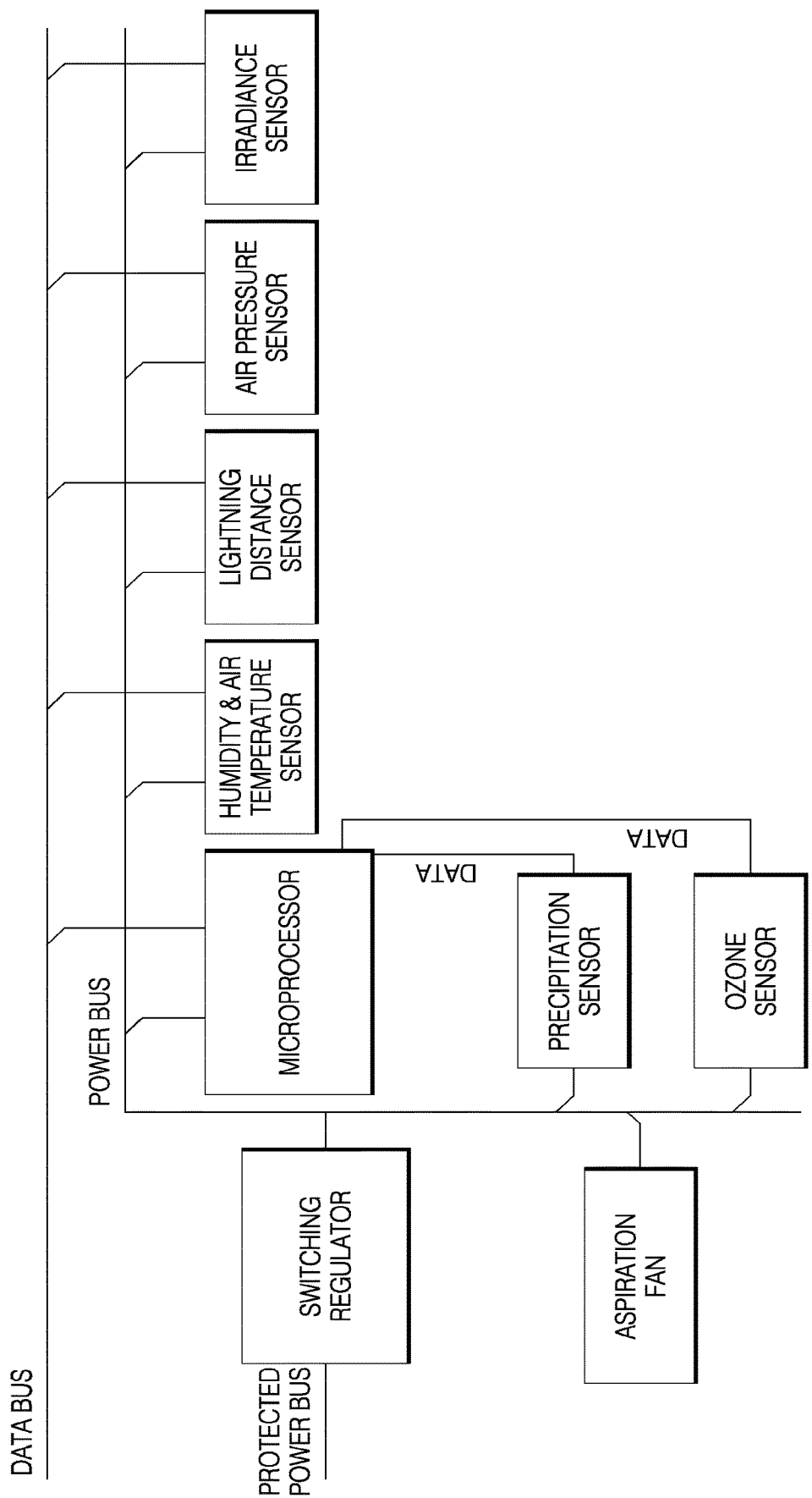
FIG. 24 is a block schematic of one embodiment of the data, communication, and/or circuitry components of a main sensor unit.

An illustrative embodiment of one method of providing power and/or data connections to the illustrative embodiment of a main assembly 100 shown in FIGS. 16A-16G and various components thereof is shown schematically in FIG. 24. As shown, this embodiment of a main assembly 100 and primary circuitry 138*a* may be configured to receive power from another source, which source may include but is not limited to existing devices and/or systems of a vehicle. However, other sources of power and/or other communication methods may be used without limitation. A switching regulator may be required to remove power spikes and other irregularities from the power source and to provide electricity at a lower voltage, which lower voltage may be required for the primary circuitry 138*a*. The main assembly 100 may also be configured to receive power from the controller 170 and communicate therewith via suitable conduit 16 and/or wirelessly.

As shown, the main assembly 100 may be configured with primary circuitry 138*a* comprising a microprocessor, which microprocessor may be in communication with, including but not limited to, any sensor within the main assembly 100 (e.g., temperature/humidity sensor 135*a*, lightning sensor 135*b*, ozone sensor 135*c*, air quality sensor), any sensor engaged with the exterior housing 110 (e.g., pyranometer 160, precipitation sensor 150), or any other sensor in that specific embodiment of a data collection apparatus 10. The microprocessor in the main assembly 100 and the microprocessor in the controller 170 may be configured such that the microprocessor in the main assembly 100 is a slave to that in the controller 170. The microprocessor and primary circuitry 138*a* may be configured to continuously monitor the sensors engaged with or positioned within the main assembly 100 and/or any other sensors in the data collection apparatus 10. If the microprocessor in the main assembly 100 detects any data of special significance (e.g., abnormalities, maximums, minimums, etc.), which special significance may be predetermined and programmed into a computer executable method residing on the data collection apparatus 10, the microprocessor may be configured to send that data to the controller 170 immediately with instructions to pass that data on to the telematics unit 15 immediately, and with instructions for the telematics unit 15 to communicate it immediately with an external database or another external device (e.g., via providing a message header indicating a communication priority for that data). In some embodiments, the controller 170 may be configured to also serve as a telematics unit 15, or another component of the data collection apparatus 10 may be configured as a telematics unit 15 (e.g., a wind sensor 40), in which case fewer steps may be required for the data collection apparatus 10 to communicate the data to a database or other external device. In either embodiment, the data collection apparatus 10 may be configured with a memory unit to record and save data prior to transmission to an external device.

An illustrative embodiment of one method of providing power and/or data connections to the illustrative embodiment of a surface temperature sensor 50 shown in FIGS.

Figure 25:
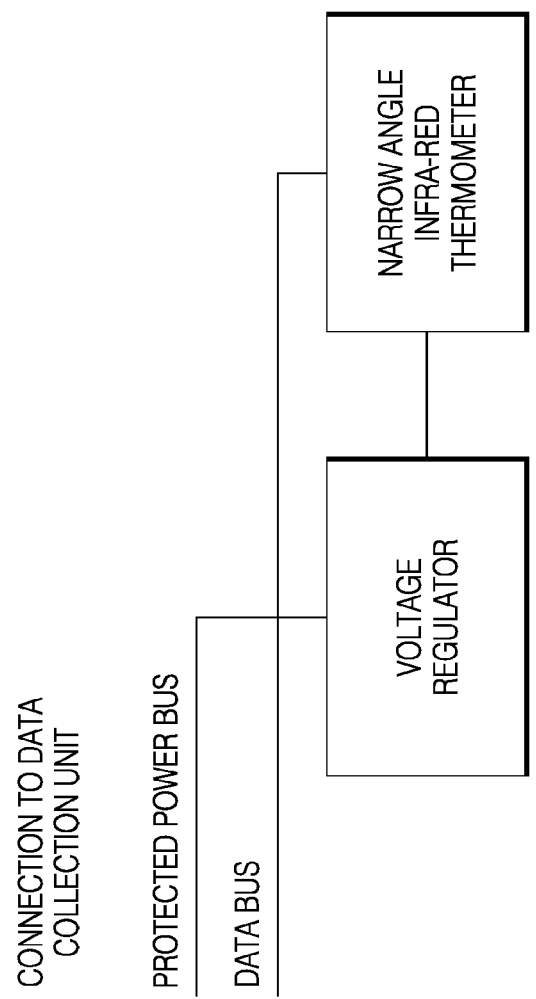
FIG. 25 is a block schematic of one embodiment of the data, communication, and/or circuitry components of a road surface temperature sensor.

19A and 19B is shown schematically in FIG. 25. As shown, this embodiment of a surface temperature sensor 50 and surface temperature sensor circuitry 58 may be configured to receive power via a regulated power bus from a communication/power interface 175 on the controller 170, which controller 170 may comprise a data collection unit. However, other sources of power and/or other communication methods may be used without limitation. The surface temperature sensor circuitry 58 may comprise a voltage regulator in communication with the thermometer 55, which may be configured as a narrow angle infrared thermometer, as shown in FIG. 25. Data from the surface temperature sensor 50 may be relayed to the controller 170 in accordance with the present disclosure via a data bus as shown schematically in FIGS. 23 & 25.

Figure 26:
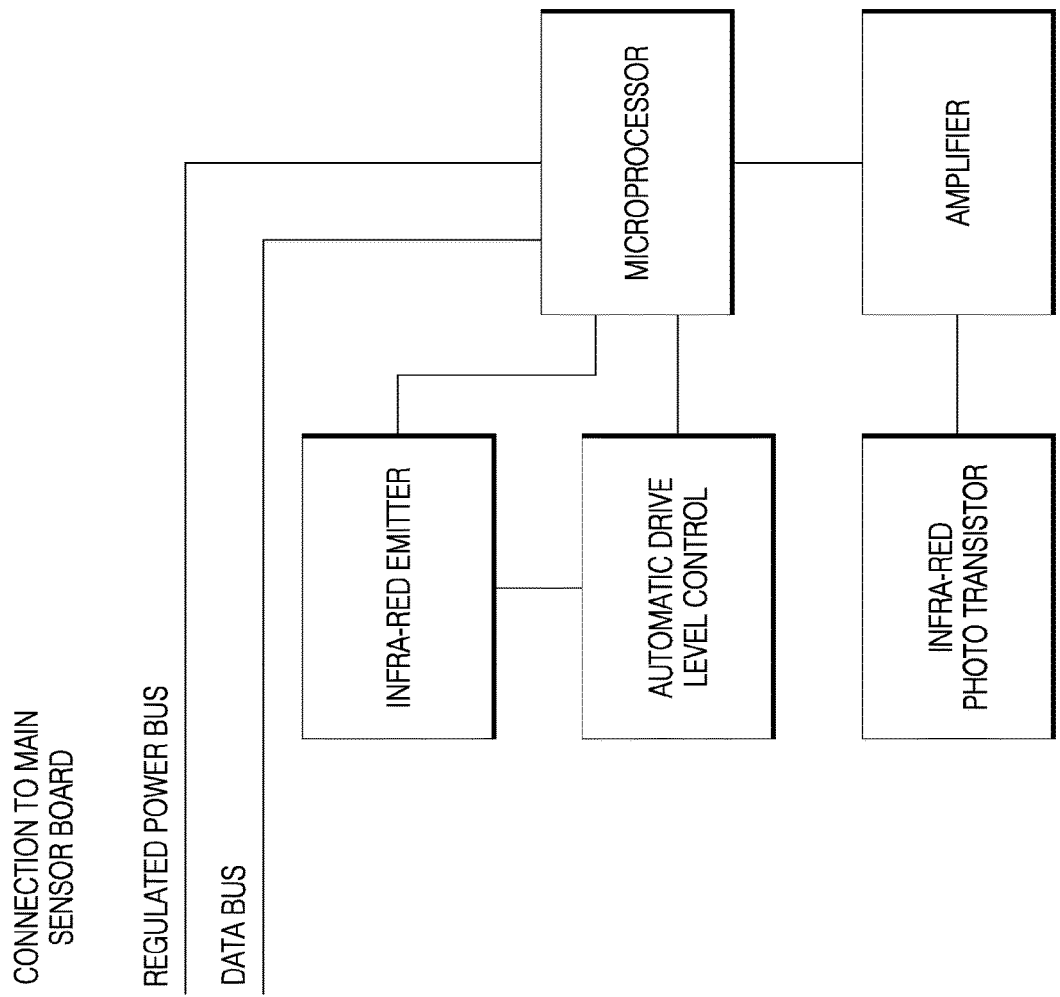
FIG. 26 is a block schematic of one embodiment of the data, communication, and/or circuitry components of a precipitation sensor.

An illustrative embodiment of one method of providing power and/or data connections to the illustrative embodiment of a precipitation sensor 150 shown in FIGS. 16A-16E and 17 is shown schematically in FIG. 26. As shown, this embodiment of a precipitation sensor 150 and precipitation sensor circuitry 151 may be configured to receive power from a regulated power bus coming from the primary circuitry 138a of the main assembly 100, and may be in direct communication therewith via a data bus. However, other sources of power and/or other communication methods may be used without limitation.

The illustrative embodiment of a precipitation sensor 150 shown in FIGS. 16A-16E and 17 may require relatively extensive processing. Accordingly, the precipitation sensor circuitry 151 may include a dedicated microprocessor. An infrared emitter and photo transistor may be in communication with the microprocessor of the precipitation sensor circuitry 151 (in cooperation with an automatic drive level control and amplifier) to detect precipitation in the manner previously described above. The microprocessor in the precipitation sensor circuitry 151 may be in a master/slave arrangement such that the precipitation sensor 150 and precipitation sensor circuitry 151 may be ultimately controlled by the primary circuitry 138a in the main assembly 100 such that data with special significance from the precipitation sensor 150 is handled in a manner similarly to that described above for the surface temperature sensor 50.

Figure 27:
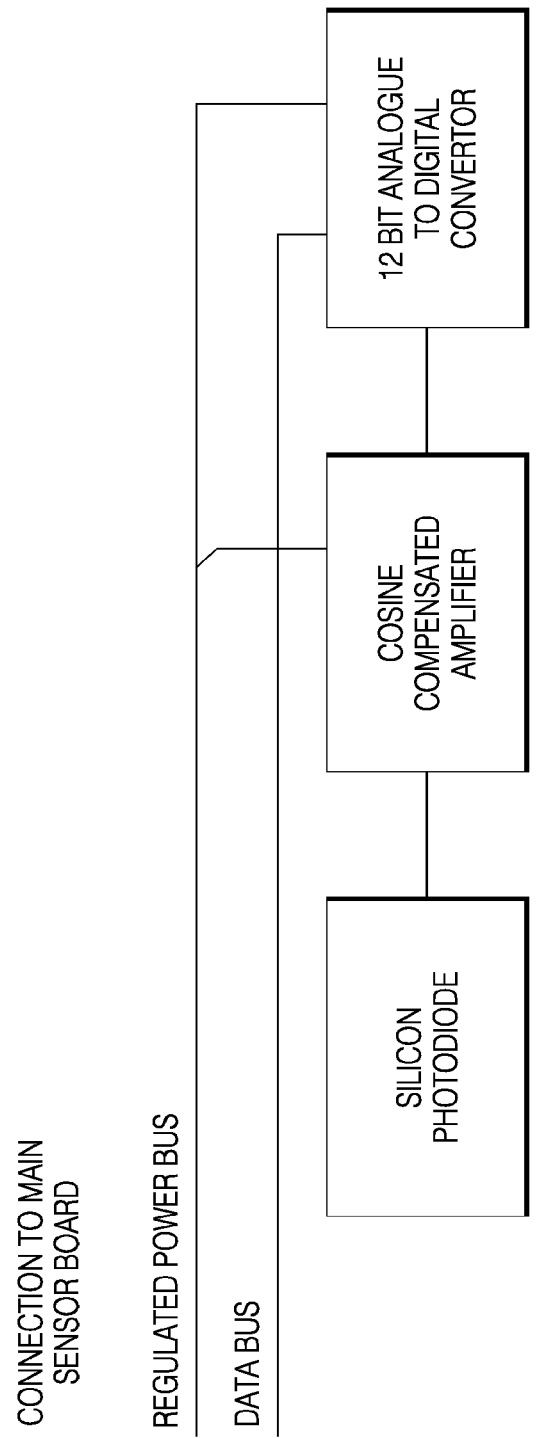
FIG. 27 is a block schematic of one embodiment of the data, communication, and/or circuitry components of a pyranometer.

An illustrative embodiment of one method of providing power and/or data connections to the illustrative embodiment of a pyranometer 160 shown in FIGS. 16A-16F is shown schematically in FIG. 27. As shown, this embodiment of a pyranometer 160 and pyranometer circuitry 162 may be configured to receive power from a regulated power bus coming from the primary circuitry 138a of the main assembly 100, and may be in direct communication therewith via a data bus. However, other sources of power and/or other communication methods may be used without limitation. As shown, the pyranometer 160 may include pyranometer circuitry 162 comprising a silicon photodiode in communication with a cosine compensated amplifier. Both the cosine compensated amplifier and a 12-bit analogue-to-digital converter may be in communication with the main assembly 100 via the data bus previously described. Accordingly, in the illustrative embodiment it is contemplated that the pyranometer may be controlled via the microprocessor in the main circuitry 138a of the main assembly 100.

Figure 28:
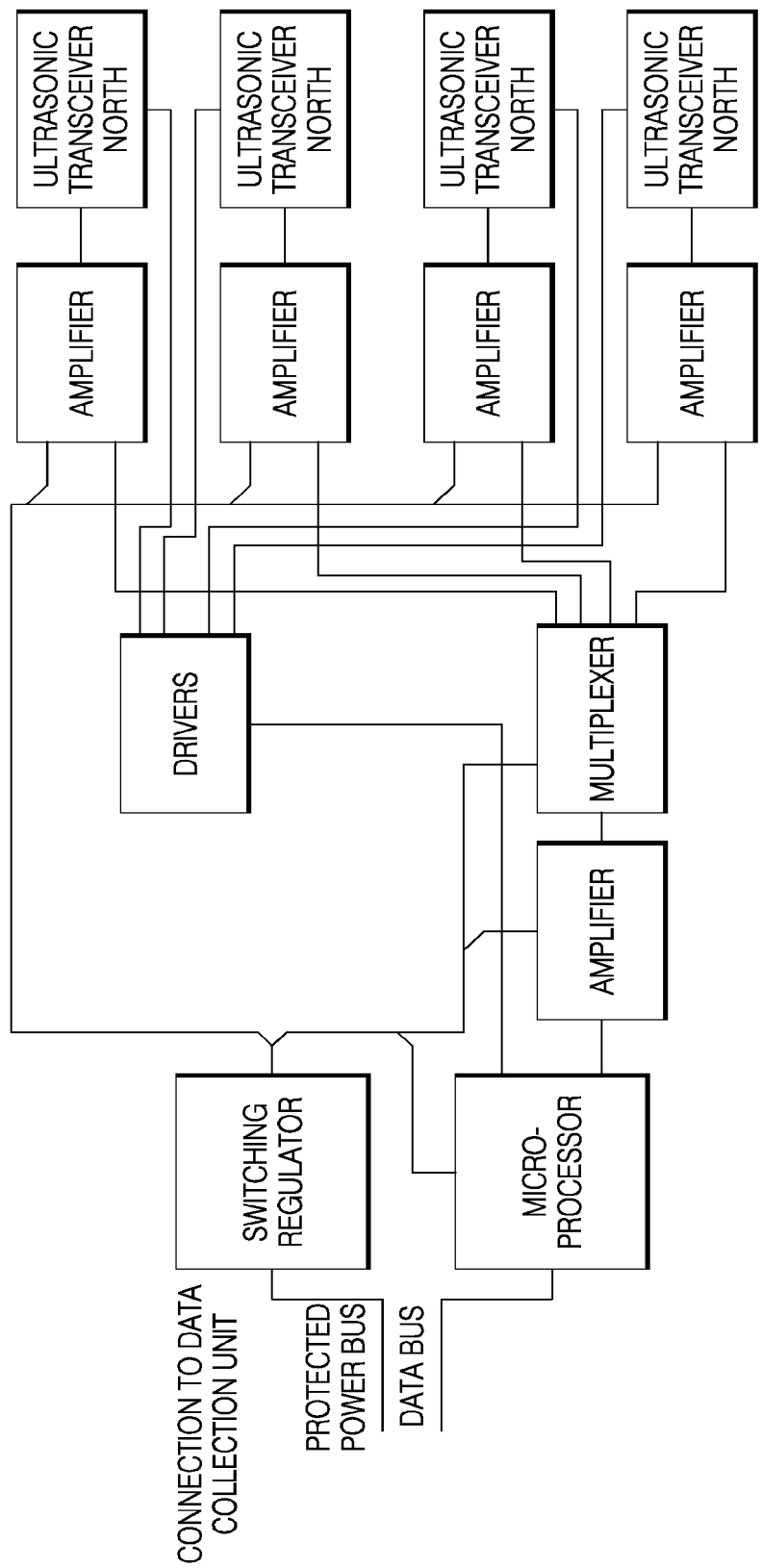
FIG. 28 is a block schematic of one embodiment of the data, communication, and/or circuitry components of an ultrasonic wind sensor.

An illustrative embodiment of one method of providing power and/or data connections to the illustrative embodiment of a wind sensor 40 shown in FIGS. 18A-18D is shown schematically in FIG. 28. As shown, this embodiment of a wind sensor 40 and ultrasonic circuitry 44b and/or GPS/communication circuitry 48 may be configured to receive power via a regulated power bus from a communication/power interface 175 on the controller 170, which controller 170 may comprise a data collection unit. However, other sources of power and/or other communication methods may be used without limitation.

Generally, it is contemplated that a portion of the illustrative embodiment of a wind sensor 40 may function in a manner similar to that in which prior art ultrasonic wind sensors function. As shown, the wind sensor 40 may include four ultrasonic transceivers oriented in a cross pattern. Each transceiver may be in communication with an amplifier and a driver. Each amplifier may be in communication with a multiplexer, and a distinct amplifier may be employed. All components of the ultrasonic circuitry 44b may be in communication with and/or controlled by a microprocessor.

It is contemplated that a GPS unit (not shown, but which may be included in a telematics unit 15) and GPS/communication circuitry 48 may be employed to correct data from the wind sensor 40 for the direction and speed of the vehicle to which it is mounted. Accordingly, in an embodiment of a data collection apparatus 10 having an embodiment wind sensor 40 such as that shown in FIGS. 18A-18D, the wind sensor 40 may also serve as a telematics unit 15 providing the necessary data and communications functionality for the data collection apparatus 10. In such an embodiment of a wind sensor 40, it is contemplated that data from the on-board systems of the vehicle may be used to ensure the data from the wind sensor 40 is properly corrected. For example, relevant data for properly correcting wind speed data may include but is not limited to braking information, throttle position, engine speed, etc. If such data is not needed for correcting wind speed data, it may have other uses, such as vehicle diagnostics. Additionally, the controller 170 may be configured to communicate and/or record such data. Accordingly, the scope of the present disclosure is not limited by the data that may be communicated to an external device via any component of the data collection apparatus 10.

All sensors included in a particular embodiment of a data collection method and apparatus 10 may be monitored constantly for out-of-range data or non-existent data, which monitoring may be done via a computer executable method residing on the controller 170, circuitry on the sensor itself, or another component of the data collection apparatus 10. In the event that such data is detected, the controller 170 may be configured such that the microprocessor in the controller circuitry 177 includes in-built recovery routines in a computer executable method that attempt to restore correct operation without the need for physical resets of any component of the data collection apparatus 10. This configuration may also allow components of the data collection apparatus 10 to be hot "pluggable" with respect to the controller 170, and accordingly with respect to the data collection apparatus 10. It is contemplated that an I2C bus may provide optimal functionality in such a configuration, which may allow addressability and accessability among all components of that embodiment of a data collection apparatus 10. An example of such a scheme is shown in the process flow of FIG. 29, which is described in further detail below.

Figure 29:
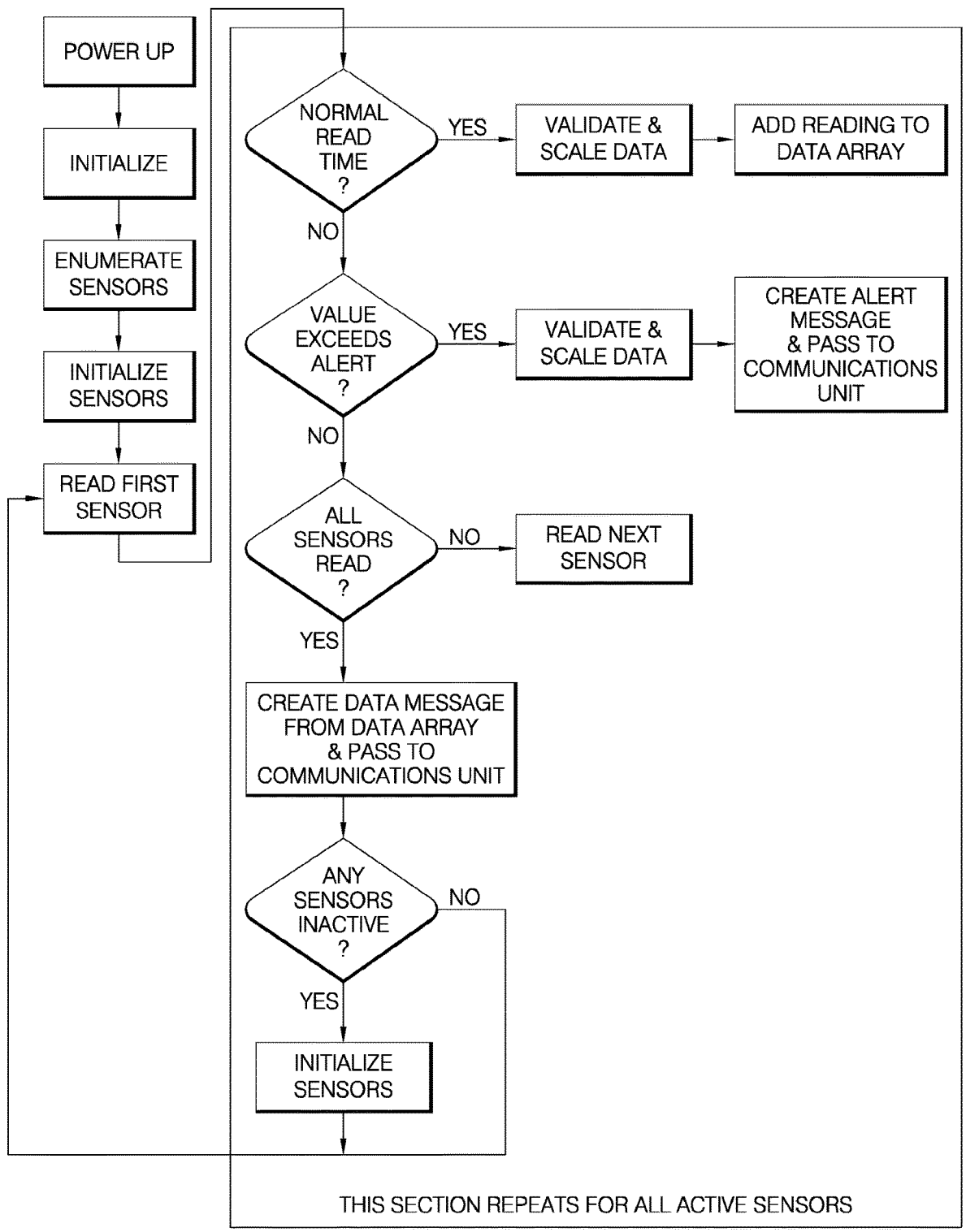
FIG. 29 is a block schematic of one embodiment of the data, communication, and/or circuitry components of a sensor read and report program flow.

An illustrative embodiment of one computer executable method that may be used with certain embodiments of the data collection method and apparatus 10 is shown schematically in FIG. 29. The illustrative embodiment of the method shown in FIG. 29 may be configured such that the method comprises a list of all sensor that could be included in the data collection apparatus 10. The method may then perform a search for which sensor are actually present in that embodiment of a data collection apparatus 10.

The illustrative embodiment of the method may repeat in a loop-like fashion for all active sensors, in which the method monitors data and/or specific parameters of all active sensors. The method may be configured to monitor the time required for each active sensor to take a reading. As shown, if the read time is normal, the method may validate and scale the data and then add the resulting value to a data array. The data in the data array may be stored locally indefinitely, the data may be placed in a buffer and communicated to an external device at predetermined periods, or the data may be communicated to an external device in real time or near real time.

The method may also monitor the value of the data from an individual sensor to monitor if that value triggers a predetermined alert (e.g., maximum, minimum, change from last value, etc.). If the value triggers such an alert, the method may include instructions for that data to be communicated to other components of the data collection apparatus 10 and/or an external device immediately. The method shown in the rectangle in FIG. 29 may repeat continuously for all active sensors in the data collection apparatus 10. The illustrative method shown schematically in FIG. 29 may also be configured to recognize non-existent and/or erroneous values. If the method encounters such a value, the method may be configured to attempt to reinitialize the sensor from which that value originated.

Any individual sensor and/or component of a specific embodiment of a data collection apparatus 10 may be formed with a communication/power interface for wired communication via a suitable conduit 16 with another device and/or to receive electrical power from another device using any method and/or structure suitable for the particular application of the data collection apparatus 10. The specific location and/or mounting point of the communication/power interface is not limited by the illustrative embodiments pictured and described herein, and the scope of the present disclosure is in no way limited thereby. In other embodiments, any individual sensor and/or component of a specific embodiment of a data collection apparatus 10 may also be configured to communicate wirelessly with other devices without limitation, in which case a power interface may be required for that specific individual and/or component.

Any individual sensor and/or component (e.g., controller 170, main assembly 100, telematics unit 15, etc.) of the data collection apparatus 10 may be configured with a predetermined amount of memory. Any microprocessor and/or properly configured circuitry in communication with the memory may be configured to record specific data on that memory. The controller 170 may be configured with a central memory unit. Any of the microprocessors and/or properly configured circuitry in any embodiment of the data collection method and apparatus 10 may be configured to receive instructions in the form of one or more computer executable methods. It is contemplated that the computer executable methods may be updated and/or changed at any time the user desires in a wired or wireless manner, without limitation. It is further contemplated that the computer executable methods may be configured to employ all the functionality desired for the specific embodiment of the data collection apparatus 10, including but not limited to interval sensing instructions, adaptive interval sensing instructions, monitoring of data, functionality, and power draw of various sensors, start-up routines, and/or diagnostic instructions for any component in the data collection apparatus 10.

As used herein, the term "circuitry" is meant in its broadest sense, and includes any type of electrical and/or electronic components and/or feature that is required or may be useful for use with the data collection method and apparatus, including but not limited to resistors, RAM, PCB, transistors, diodes, receivers, transmitters, transponders, wiring, microprocessors, microchips, and microelectromechanical systems. It is contemplated that many sensors that are configured to detect an analogue signals but convert those signals to digital may require a microprocessor.

Any of the various elements of the various components of a specific embodiment of a data collection apparatus 10 may be engaged with one another and/or secured to one another using any suitable method and/or structure. Accordingly, the various elements may be engaged with one another and/or secured to one another with method including but not limited to mechanical fasteners (e.g., screws, bolts, etc.), chemical adhesives, welding, thermoforming and/or molding, and/or combinations thereof, and the specific method and/or structure used to engage and/or secure one element to another in no way limits the scope of the data collection method and apparatus 10.

The data collection method and apparatus 10 and various components thereof are not limited by the means of construction or the materials chosen. Any suitable material may be used in the construction of the data collection apparatus 10 and various components thereof including but not limited to polymers, metal or metallic alloys, natural materials, and/or combinations thereof.

The preceding constraints and illustrative embodiments in any of the examples included herein (e.g., specific operating ranges, communication protocols, operational parameters, dimensions, orientations, etc.) and relationships between the various components as disclosed and described herein are for illustrative purposes only, and are in no way limiting to the scope of any of the apparatuses and/or methods as disclosed and claimed herein. Furthermore, the various solutions, processes, methods, modules, apparatuses and/or embodiments disclosed or described herein may be implemented in conjunction with one another or independently from one another, depending on the specific embodiment and implementation of the data collection apparatus 10 and method. Accordingly, the presence or absence of other subject matter that may be complementary to the present method and apparatus in no way limits the scope of the present method and/or apparatus.

It should be noted that the data collection method and apparatus 10 are not limited to the specific embodiments described herein, but is intended to apply to all similar method and/or apparatuses for data collection and subsequent analyzing and/or processing thereof. Modifications and alterations from the described embodiments will occur to those skilled in the art without departure from the spirit and scope of the data collection methods and/or apparatuses 10 disclosed herein. Modifications and alterations from the described embodiments will occur to those skilled in the art without departure from the spirit and scope of the data collection method and apparatus 10. Furthermore, variations and modifications of the foregoing are within the scope of the data collection method and apparatus 10. It is understood that the data collection method and apparatus 10 as disclosed herein extends to all alternative combinations of one or more of the individual features mentioned, evident from the text and/or drawings, and/or inherently disclosed. All of these different combinations constitute various alternative aspects of the data collection method and apparatus 10 and/or components thereof. The embodiments described herein explain the best modes known for practicing the data collection method and apparatus 10 and/or components thereof and will enable others skilled in the art to utilize the same. The claims are to be construed to include alternative embodiments to the extent permitted by the prior art.

The invention claimed is:

1. A data collection method comprising the steps:
   a. engaging a main assembly with an upwardly facing surface of a vehicle, wherein said main assembly comprises:
      i. an exterior housing having a width, a length, and a height, wherein said exterior housing comprises:
         1. an inlet formed at a first end of said exterior housing, wherein said inlet is formed along said height of said exterior housing;
         2. an outlet formed at said first end of said exterior housing adjacent said inlet, wherein said outlet is formed along said height of said exterior housing;
         3. a slope formed on a second end of said exterior housing, wherein said slope is formed along said height of said exterior housing, and wherein said main assembly is oriented such that said slope provides a leading edge for said main assembly;
      ii. a base engaged with said exterior housing, wherein said base is generally planar in shape, and wherein said base is formed with a plurality of extensions extending from said base such that a height of said plurality of extensions is generally perpendicular to said base;
      iii. an interior member positioned within said exterior housing, said interior member comprising:
         1. a first side wall generally parallel with respect to said height of said exterior housing;
         2. a second side wall generally parallel with respect to said first side wall;
         3. a top wall extending from a top portion of said first side wall to a top portion of said second side wall, wherein said top wall is generally parallel with respect to said width of said exterior housing, wherein a first volume defined by said first and second side walls and said top wall forms a main sensing chamber, and wherein said height of said plurality of extensions defines a distance between said top wall and said base and thereby defining a height of said main sensing chamber;
         4. a primary circuitry positioned on an exterior surface of said top wall;
         5. an exhaust fan housing formed in a portion of said interior member, wherein said exhaust fan housing is positioned adjacent said outlet of said exterior housing, said exhaust fan housing comprising:
            a. a first side wall generally parallel with said first side wall of said interior member;
            b. a second side wall generally parallel with said second side wall of said interior member, wherein said second side wall of said exhaust fan housing is positioned between said first and second side walls of said interior member;
            c. an end wall connecting a first end of said first side wall with a first end of said second side wall, wherein said end wall is positioned opposite said outlet of said exterior housing, and wherein said exhaust fan housing is in fluid communication with said outlet of said exterior housing;
            d. a top wall engaged with said first, second, and end walls, wherein said top wall is formed with a fan inlet;
            e. a fan positioned in said exhaust fan housing, wherein said fan is oriented to direct ambient air out of said interior member through said outlet of said exterior housing and into said exhaust fan housing through said fan inlet;
         6. an entrance zone positioned adjacent said inlet of said exterior housing, wherein a width of said entrance zone is defined by a distance between said first side wall of said interior member and said second side wall of said exhaust fan housing;
      iv. allowing a controller in to communicate with said primary circuitry;
      v. an air temperature sensor positioned within said main assembly, wherein said air temperature sensor is in communication with said controller;
   b. ensuring ambient air entering said exterior member via said inlet thereof contacts said air temperature sensor prior to exiting said exterior housing via said outlet thereof;
   c. programming said controller to cause said air temperature sensor to take a measurement at a specific time interval;
   d. engaging a precipitation sensor with an exterior surface of said top wall of said exterior housing;
   e. programming said controller to cause said precipitation sensor to take a measurement at a specific time interval; and,
   f. allowing said controller to communicate with an existing telematics unit within said vehicle.

2. The method according to claim 1 wherein said controller further comprises a barometric pressure sensor positioned within said controller, wherein said barometric pressure sensor is in communication with said controller, and wherein said method further comprises the step of programming said controller to cause said barometric pressure sensor to take a second measurement at a second specific time interval.

3. The method according to claim 1 wherein said main assembly further comprises an air humidity sensor positioned within said main assembly, wherein said air humidity sensor is in communication with said controller, and wherein said method further comprises the step of programming said controller to cause said air humidity sensor to take a third measurement at a third specific time interval.

4. The method according to claim 3 wherein said controller further comprises a buffer, wherein said controller is configured to cause a first portion of data from said measurement of said air temperature sensor to be stored in said buffer, and wherein said controller is configured to analyze at least said first portion of data from said measurement of said air temperature sensor in real-time such that said controller is able to identify an anomaly in said first portion of data.

5. The method according to claim 4 wherein said main assembly further comprises an ozone sensor, and wherein said ozone sensor is in communication with said controller.

6. The method according to claim 5 wherein said main assembly further comprises a pyranometer, wherein said pyranometer is in communication with said controller.

7. The method according to claim 6 wherein said main assembly further comprises a wind sensor, wherein said wind sensor is in communication with said controller.

8. The method according to claim 7 wherein said controller is further defined as being configured to be in wired communication with said existing telematics unit.

9. The method according to claim 1 wherein said first side wall of said interior member and said second side wall of said exhaust fan housing are further defined as being configured to accomplish said step of ensuring ambient air entering said exterior member via said inlet thereof contacts said temperature/humidity sensor prior to exiting said exterior housing via said outlet thereof.

10. A data collection method comprising the steps:
   a. engaging a main assembly with an upwardly facing surface of a vehicle, wherein said main assembly comprises:
      i. an exterior housing having a length, a width and a height, wherein said exterior housing is formed with an inlet and an outlet, and wherein said inlet and said outlet are positioned adjacent one another;
      ii. a base engaged with said exterior housing, wherein said base is generally planar in shape, and wherein said base is formed with a plurality of extensions extending from said base such that a height of said plurality of extensions is generally perpendicular to said base;
      iii. an interior member engaged with said base, wherein said interior member is positioned between said base and said exterior housing, wherein said interior member engages a distal end of each said extension in said plurality thereof, wherein said interior member is configured with a main sensing chamber, wherein said height of said plurality of extensions defines a height of said main sensing chamber, and wherein a primary circuitry is engaged with said interior member; and,
      iv. a temperature/humidity sensor positioned in said main sensing chamber, wherein said temperature/humidity sensor is in communication with said primary circuitry;
      v. allowing a controller in to communicate with said primary circuitry;
      vi. an air temperature sensor positioned within said main assembly, wherein said air temperature sensor is in communication with said controller;
   b. ensuring ambient air entering said exterior member via said inlet thereof contacts said temperature/humidity sensor prior to exiting said exterior housing via said outlet thereof;
   c. programming said controller to cause said air temperature sensor to take a measurement at a specific time interval;
   d. engaging a precipitation sensor with an exterior surface of said top wall of said exterior housing;
   e. programming said controller to cause said precipitation sensor to take a measurement at a specific time interval; and,
   f. allowing said controller to communicate with an existing telematics unit within said vehicle.

11. The method according to claim 10 wherein said main assembly further comprises an interstitial area positioned between an exterior surface of said interior member and an interior surface of said exterior housing.

12. The method according to claim 11 wherein said interior member further comprises:
   a. a first a first side wall generally parallel with respect to said height of said exterior housing;
   b. a second side wall generally parallel with respect to said first side wall;
   c. a top wall extending from a top portion of said first side wall to a top portion of said second side wall, wherein said top wall is generally parallel with respect to said width of said exterior housing, and wherein a first volume defined by said first and second side walls and said top wall forms said main sensing chamber.

13. The method according to claim 12 wherein said interior member further comprises an exhaust fan housing formed in a portion of said interior member, wherein said exhaust fan housing is positioned adjacent said outlet of said exterior housing, and wherein said exhaust fan housing comprises:
   a. a first side wall generally parallel with said first side wall of said interior member;
   b. a second side wall generally parallel with said second side wall of said interior member, wherein said second side wall of said exhaust fan housing is positioned between said first and second side walls of said interior member;
   c. an end wall connecting a first end of said first side wall with a first end of said second side wall, wherein said end wall is positioned opposite said outlet of said exterior housing, and wherein said exhaust fan housing is in fluid communication with said outlet of said exterior housing;
   d. a top wall engaged with said first, second, and end walls, wherein said top wall is formed with a fan inlet;
   e. an exit zone opposite said end wall;
   f. a fan positioned in said exhaust fan housing, wherein said fan is oriented to direct ambient air out of said interior member through said exit zone and said outlet of said exterior housing and into said exhaust fan housing through said fan inlet.

14. The method according to claim 13 wherein said interior member further comprises an entrance zone positioned adjacent said inlet of said exterior housing, wherein a width of said entrance zone is defined by a distance between said first side wall of said interior member and said second side wall of said exhaust fan housing.

15. The method according to claim 14 wherein said main assembly further comprises a baffle extending upward from said base toward said top wall of said interior member, wherein said baffle is positioned in said entrance zone.

16. The method according to claim 15 wherein said main assembly further comprises a filter positioned between said exterior housing and said interior member adjacent said inlet and said outlet of said exterior housing.

17. The method according to claim 16 wherein said main assembly further comprises a lightning sensor positioned in said main sensing chamber, wherein said lightning sensor is in communication with said primary circuitry.

18. The method according to claim 17 wherein said main assembly further comprises an ozone sensor positioned in said main sensing chamber, wherein said ozone sensor is in communication with said primary circuitry.

19. The method according to claim 10 wherein said interior member is configured to accomplish said step of ensuring ambient air entering said exterior member via said inlet thereof contacts said temperature/humidity sensor prior to exiting said exterior housing via said outlet thereof by providing a fluid barrier between said inlet and said outlet of said exterior housing within said exterior housing.

* * * * *